US011527922B2

(12) United States Patent
Lee et al.

(10) Patent No.: US 11,527,922 B2
(45) Date of Patent: Dec. 13, 2022

(54) APPARATUS FOR TRANSMITTING AND RECEIVING INFORMATION ABOUT AMOUNT OF POWER FOR IDENTIFYING TRANSMISSION EFFICIENCY ASSOCIATED WITH WIRELESS POWER TRANSFER AND CONTROL METHOD THEREFOR

(71) Applicant: Samsung Electronics Co., Ltd., Gyeonggi-do (KR)

(72) Inventors: Wooram Lee, Gyeonggi-do (KR); Seho Park, Gyeonggi-do (KR); Yusu Kim, Gyeonggi-do (KR); Kyungmin Park, Gyeonggi-do (KR); Juhyang Lee, Gyeonggi-do (KR); Byungyeol Choi, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 70 days.

(21) Appl. No.: 16/573,329

(22) Filed: Sep. 17, 2019

(65) Prior Publication Data
US 2020/0091780 A1 Mar. 19, 2020

(30) Foreign Application Priority Data
Sep. 18, 2018 (KR) .................. 10-2018-0111437

(51) Int. Cl.
*H02J 50/90* (2016.01)
*H02J 50/80* (2016.01)
(Continued)

(52) U.S. Cl.
CPC ............. *H02J 50/80* (2016.02); *H02J 7/025* (2013.01); *H02J 50/10* (2016.02)

(58) Field of Classification Search
CPC ..................................................... H02J 50/80
(Continued)

(56) References Cited

U.S. PATENT DOCUMENTS 10,135,289 B2 11/2018 Kim et al.
2010/0070219 A1 3/2010 Azancot et al.
(Continued)

FOREIGN PATENT DOCUMENTS

JP 2018057174 * 4/2018 ............. H02J 50/50
KR 10-1438880 11/2014
(Continued)

OTHER PUBLICATIONS

International Search Report dated Jan. 17, 2020 issued in counterpart application No. PCT/KR2019/012039, 12 pages.
(Continued)

*Primary Examiner* — Edward Tso
*Assistant Examiner* — Ahmed H Omar
(74) *Attorney, Agent, or Firm* — The Farrell Law Firm, P.C.

(57) ABSTRACT

A wireless power transmitter is provided. The wireless power transmitter includes an inverter configured to output alternating current (AC) power using direct current (DC) power, a coil configured to receive the AC power, and a control circuitry, wherein the control circuitry is configured to identify an input associated with transmitting the AC power, output the AC power at a specified frequency determined according to the input, using the inverter, transmit the AC power to an external electronic device using the coil, and, while at least partially transmitting the AC power to the external electronic device, transmit information associated with an amount of the DC power input to the inverter to output the AC power to the external electronic device, such that the external electronic device identifies transmission efficiency of the AC power using the information associated with the amount of DC power.

13 Claims, 16 Drawing Sheets

(51) Int. Cl.
*H02J 7/02* (2016.01)
*H02J 50/10* (2016.01)

(58) Field of Classification Search
USPC .......................................................... 320/108
See application file for complete search history.

(56) References Cited

U.S. PATENT DOCUMENTS

| | | | |
|---|---|---|---|
| 2010/0072825 A1 | 3/2010 | Azancot et al. | |
| 2012/0071091 A1 | 3/2012 | Azancot et al. | |
| 2012/0149307 A1 | 6/2012 | Terada et al. | |
| 2014/0070625 A1* | 3/2014 | Kim | H02J 50/12 307/104 |
| 2015/0022144 A1* | 1/2015 | Amari | H02J 50/80 320/108 |
| 2016/0355095 A1* | 12/2016 | Okamoto | B60L 53/305 |
| 2017/0279310 A1* | 9/2017 | Ii | H02J 50/12 |
| 2019/0013702 A1* | 1/2019 | Muratov | H02J 7/025 |

FOREIGN PATENT DOCUMENTS

| | | |
|---|---|---|
| KR | 20150019873 | 2/2015 |
| KR | 1020160061837 | 6/2016 |
| KR | 10-1753032 | 6/2017 |
| KR | 20170124894 | 11/2017 |
| WO | WO 2017/095112 | 6/2017 |

OTHER PUBLICATIONS

European Search Report dated Aug. 3, 2021 issued in counterpart application No. 19861618.7-1202, 10 pages.

* cited by examiner

| 510 | $B_0$ | $b_7$ | $b_6$ | $b_5$ | $b_4$ | $b_3$ | $b_2$ | $b_1$ | $b_0$ |
|---|---|---|---|---|---|---|---|---|---|
| | | Maximum Transmitted Power Value ||||||||

| 520 | $B_0$ | $b_7$ | $b_6$ | $b_5$ | $b_4$ | $b_3$ | $b_2$ | $b_1$ | $b_0$ |
|---|---|---|---|---|---|---|---|---|---|
| | | Transmitted Power Value ||||||||

FIG.5

APPARATUS FOR TRANSMITTING AND RECEIVING INFORMATION ABOUT AMOUNT OF POWER FOR IDENTIFYING TRANSMISSION EFFICIENCY ASSOCIATED WITH WIRELESS POWER TRANSFER AND CONTROL METHOD THEREFOR

CROSS-REFERENCE TO RELATED APPLICATION(S)

This application is based on and claims priority under 35 U.S.C. § 119 to Korean Patent Application No. 10-2018-0111437, filed on Sep. 18, 2018, in the Korean Intellectual Property Office, the disclosure of which is incorporated by reference herein in its entirety.

BACKGROUND

1. Field

The disclosure relates generally to an apparatus for wirelessly transmitting and receiving power.

2. Description of Related Art

A wireless power receiver (e.g., a smartphone) may have components (e.g., a secondary coil) capable of receiving wirelessly transmitted power from a wireless power transmitter (e.g., a wireless charger).

A wireless power receiver may calculate an amount of power received from a wireless power transmitter and may transmit information associated with the amount of received power to the wireless power transmitter. The wireless power transmitter may calculate transmission efficiency based on the amount of power received by the wireless power receiver and may detect foreign substances, which interrupt power transmission, between the wireless power transmitter and the wireless power receiver. To prevent overheating due to foreign substances, the wireless power transmitter may block power transmission when foreign substances are detected.

The above information is presented as background information only to assist with an understanding of the present disclosure. No determination has been made, and no assertion is made, as to whether any of the above might be applicable as prior art with regard to the present disclosure.

As such, a conventional wireless power transmitter only performs control of detecting foreign substances based on transmission efficiency but fails to perform power control based on transmission efficiency. Furthermore, a conventional wireless power transmitter only calculates power consumption depending on a request of a wireless power transmitter and only transmits the calculated power consumption to the wireless power transmitter, but does not actively intervene in control for enhancing transmission efficiency.

SUMMARY

An aspect of the disclosure provides a wireless power transmitter for adjusting a power state associated with charging a battery based on more accurate transmission efficiency, a wireless power receiver, and a power control method therefor.

In accordance with an aspect of the disclosure, a wireless power transmitter is provided. The wireless power transmitter includes an inverter configured to output alternating current (AC) power using direct current (DC) power, a coil configured to receive the AC power, and a control circuitry, wherein the control circuitry is configured to identify an input associated with transmitting the AC power, output AC power having a specified frequency determined according to the input, using the inverter, transmit the AC power to an external electronic device using the coil, and while at least partially transmitting the AC power to the external electronic device, transmit information associated with an amount of the DC power input to the inverter to output the AC power to the external electronic device, such that the external electronic device identifies transmission efficiency of the AC power using the information associated with the amount of DC power.

In accordance with another aspect of the disclosure, wireless power receiver is provided. The wireless power receiver includes a battery, a coil configured to receive AC power wirelessly transmitted by an external electronic device, a conversion circuitry configured to convert the AC power received via the coil into DC power, a charging circuitry configured to charge the battery using the DC power, and a processor configured to, when detecting the external electronic device, set a power state including an amount of current and a voltage level associated with charging the battery to a specified state, using the charging circuitry, receive the AC power corresponding to the specified state from the external electronic device via the coil, convert the AC power into DC power using the conversion circuitry, while at least partially charging the battery using the DC power by the charging circuitry, receive information associated with an amount of transmit power transmitted from the external electronic device to the wireless power receiver, calculate reception efficiency based at least in part on the amount of transmit power and an amount of receive power received from the external electronic device, and adjust a power state of the charging circuitry to another specified state based at least in part on the reception efficiency.

In accordance with another aspect of the disclosure, a power control method by a wireless power receiver is provided. The power control method includes when detecting an external electronic device, setting a power state including an amount of current and a voltage level associated with charging a battery of the wireless power receiver to a specified state, receiving AC power corresponding to the specified state from the external electronic device via a coil of the wireless power receiver, converting the AC power into DC power using a conversion circuitry of the wireless power receiver, while at least partially charging the battery using the DC power by a charging circuitry of the wireless power receiver, receiving information associated with an amount of transmit power transmitted from the external electronic device to the wireless power receiver, calculating reception efficiency based on the amount of transmit power and an amount of receive power received from the external electronic device, and adjusting a power state of the charging circuitry to another specified state based at least in part on the reception efficiency.

BRIEF DESCRIPTION OF THE DRAWINGS

The above and other aspects, features, and advantages of certain embodiments of the disclosure will be more apparent from the following description, taken in conjunction with the accompanying drawings, in which:

FIG. 5 is an illustration of an information packet associated with an amount of transmit power, according to an embodiment;

DETAILED DESCRIPTION

Various embodiments of the disclosure will now be described in detail with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
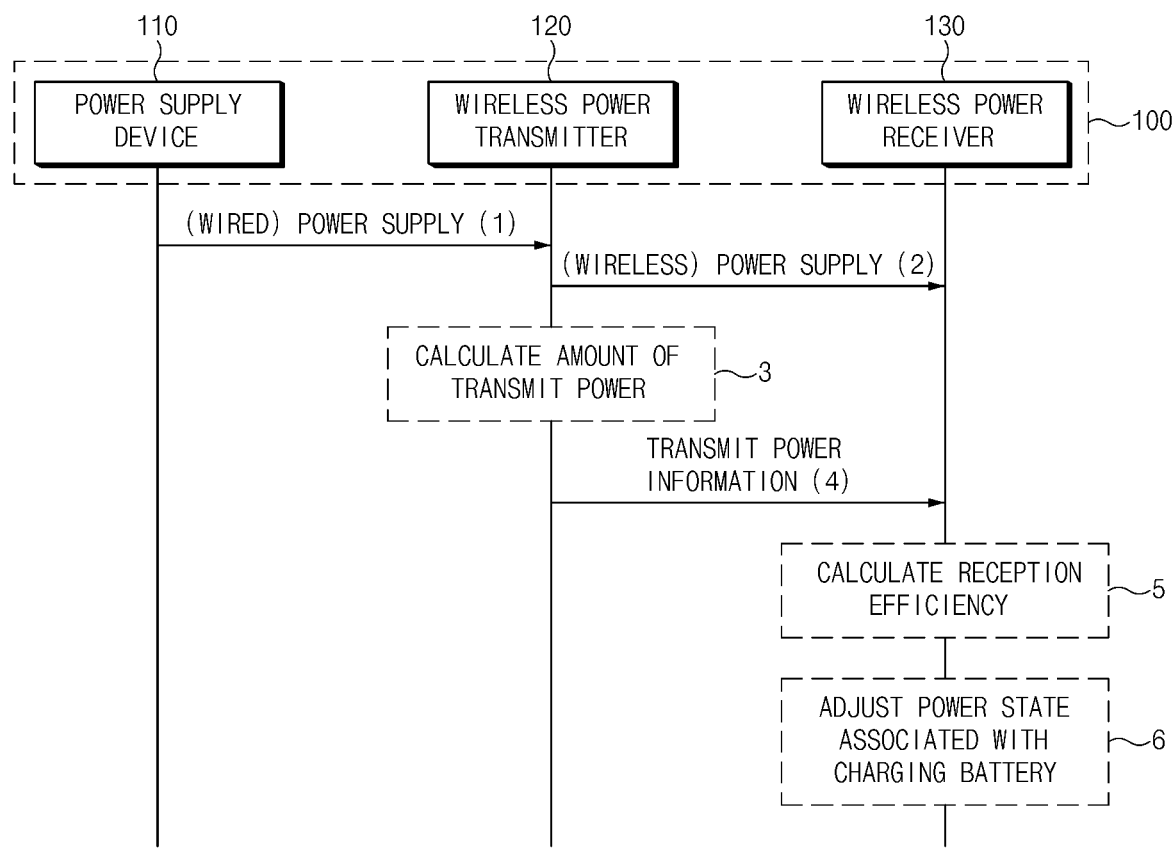
FIG. 1 is a signal sequence diagram illustrating an operational flow of a wireless power transfer system, according to an embodiment.

FIG. 1 is a signal sequence diagram illustrating an operational flow of a wireless power transfer system, according to an embodiment.

Referring to FIG. 1, a wireless power transfer system 100 includes a power supply device 110, a wireless power transmitter 120, and a wireless power receiver 130.

When receiving AC power (e.g., about 220 V) from an AC power source, in operation 1, the power supply device 110 may convert the received AC power into DC power and may output the DC power. The power supply device 110 may adjust an amount of DC power depending on a command of the wireless power transmitter 120. For example, the power supply device 110 may adjust a voltage level of the DC power (e.g., a voltage level between about 5 V and about 12 V). The power supply device 110 may include, for example, a travel adaptor (TA). At least a part of the power supply device 110 may be included in the wireless power transmitter 120. For example, the entire power supply device 110 may be included in the wireless power transmitter 120.

When the wireless power receiver 130 is close to the wireless power transmitter 120 within a specified distance, in operation 2, the wireless power transmitter 120 may transmit at least a portion of DC power received from the power supply device 110 to the wireless power receiver 130. For example, the wireless power transmitter 120 may convert the DC power into AC power having a specified frequency and may transmit the AC power to the wireless power receiver 130. The wireless power transmitter 130 may be a wireless charger and may be configured in the form of, for example, a pad, a holder, an access point (AP), a small base station, a stand, where the wireless charger is in a ceiling, a wall mount, or the like.

While transmitting power to the wireless power receiver 130, in operation 3, the wireless power transmitter 120 may calculate an amount of power (e.g., an amount of transmit power) to transmit to the wireless power receiver 130. In operation 4, the wireless power transmitter 120 may transmit information associated with the calculated amount of transmit power to the wireless power receiver 130. For example, the wireless power transmitter 120 may calculate an amount of transmit power based on the DC power before the DC power is converted into the AC power having the specified frequency. The amount of transmit power may include at least one of, for example, an amount of transmit current or a transmission voltage level. The wireless power transmitter 120 may transmit information associated with an amount of transmit power depending on a request of the wireless power receiver 130. Alternatively, the wireless power transmitter 120 may transmit the transmit power information on a periodic basis.

When receiving wireless power, the wireless power receiver 130 may charge its battery using the received AC power. For example, the wireless power receiver 130 may rectify the received AC power (having the specified frequency) into DC power and may charge the battery using the DC power. The wireless power receiver 130 may set a state of the DC power (e.g., a voltage level of the DC power or an amount of current of the DC power) used to charge the battery to a specified state and may charge the battery using the DC power according to the specified state. Hereinafter, the state of the DC power used to charge the battery is referred to as a power state associated with charging the battery.

In operation 5, the wireless power receiver 130 may identify the amount of transmit power from the information associated with the amount of transmit power and may calculate reception efficiency based on an amount of received power (e.g., receive power) as compared with the amount of transmit power. The amount of receive power may be, for example, a value detected by the wireless power receiver 130.

In operation 6, the wireless power receiver 130 may adjust the power state associated with charging the battery based on the calculated reception efficiency. For example, the wireless power receiver 130 may adjust the power state associated with charging the battery to enhance the reception efficiency.

Figure 2:
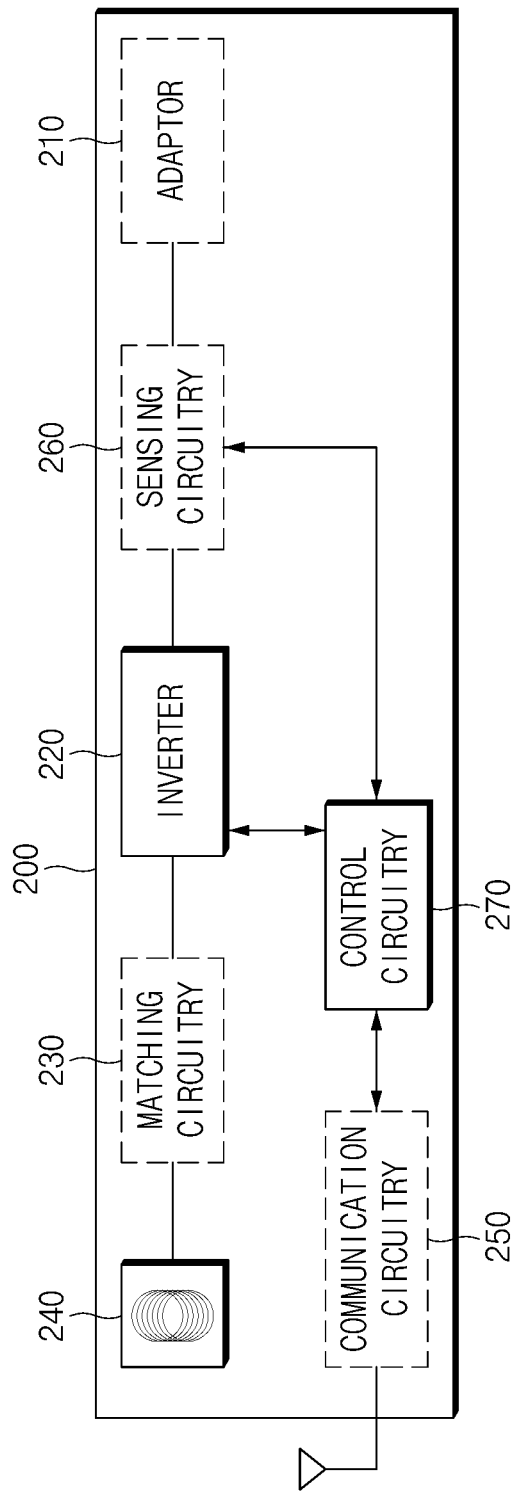
FIG. 2 is a block diagram illustrating a configuration of a wireless power transmitter, according to an embodiment.
Figure 3:
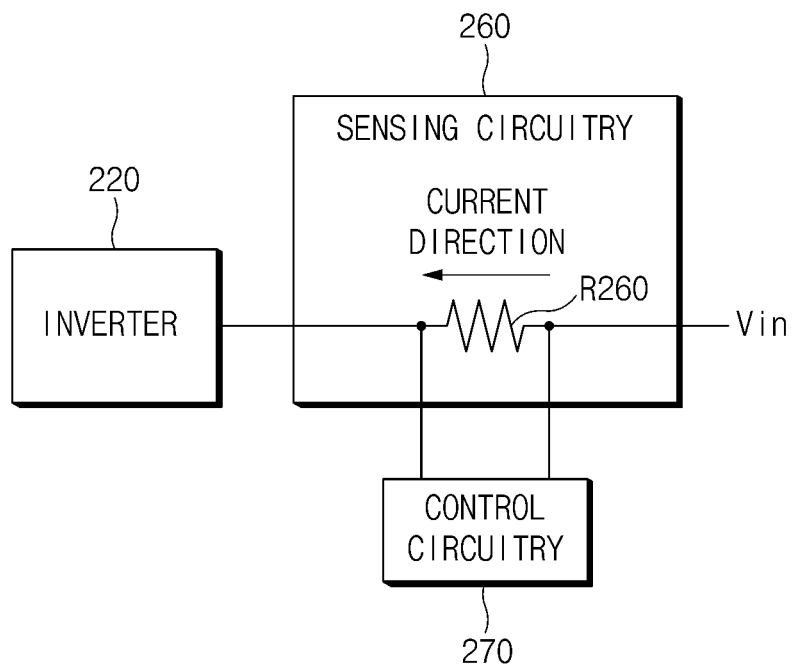
FIG. 3 is a block diagram illustrating a part (e.g., a sensing circuit) of a wireless power transmitter, according to an embodiment.

FIG. 2 is a block diagram illustrating a configuration of a wireless power transmitter according to an embodiment. FIG. 3 is a block diagram illustrating a part (e.g., a sensing circuit) of a wireless power transmitter according to an embodiment.

Referring to FIGS. 2 and 3, a wireless power transmitter 200 (e.g., the wireless power transmitter 120 of FIG. 1) may include an adaptor 210, an inverter 220, matching circuitry 230, a transmit coil 240, communication circuitry 250, sensing circuitry 260, and control circuitry 270. The wireless power transmitter 200 may fail to include some components or may further include an additional component. For example, when the wireless power transmitter 200 communicates with a wireless power receiver (e.g., the wireless power receiver 130 of FIG. 1) using the transmit coil 240, the communication circuitry 250 may be omitted. Some of the components of the wireless power transmitter 200 may be combined into one entity to perform functions of the components before the combination in the same manner. For example, the matching circuitry 230 may be included in the transmit coil 240, and the sensing circuitry 260 may be included in the control circuitry 270.

For example, when electrically connected with a power supply device 110 of FIG. 1 via a plug, the adaptor 210 may receive DC power from the power supply device 110. The DC power received from the power supply device 110 may have a level of about 5 V to about 20 V. The adaptor 210 may include a power converter (e.g., a DC/DC converter), receive DC power of a fixed level (e.g., about 5 V) from a power supply source using the power converter, convert (e.g., step up or down) the received DC power into a voltage level according to a command of the control circuitry 270, and output the converted DC power.

The inverter 220 may generate AC power having a specified frequency using the DC power received from the adaptor 210. The specified frequency may be set differently according to a power transmission scheme of the wireless power transmitter 200. For example, when the power transmission scheme of the wireless power transmitter 200 is a magnetic induction scheme, the specified frequency may include a frequency of about 110 KHz or more and about 357 KHz or less. When the power transmission scheme of the wireless power transmitter 200 is a magnetic resonance scheme, the specified frequency may be a frequency of about 6.78 MHz.

The matching circuitry 230 may match impedance between the transmit coil 240 and a receive coil included in the wireless power receiver 130.

When receiving the AC power having the specified frequency from the inverter 220, the transmit coil 240 may transmit the AC power with the specified frequency. The transmit coil 240 may transmit power to the receive circuit included in the wireless power receiver 130 in, for example, the magnetic induction scheme. The transmit coil 240 may transmit the AC power having the specified frequency in a magnetic resonance scheme or a microwave scheme.

The communication circuitry 250 may mediate communication between the control circuitry 270 and the wireless power receiver (e.g., the wireless power receiver 130 of FIG. 1). For example, the communication circuitry 250 may convert the signal received from the control circuitry 270 into a signal corresponding to a specified communication mode and may transmit the converted signal to the wireless power receiver 130 over a specified communication channel. Alternatively, the communication circuitry 250 may convert the signal received from the wireless power receiver 130 over the specified communication channel into a signal analyzable by the control circuitry 270 and may transmit the converted signal to the control circuitry 270. The communication circuitry 250 may communicate with the wireless power receiver 130 using a specified frequency (e.g., an in-band manner). For example, the communication circuitry 250 may transmit the specified frequency with information to be transmitted in a frequency shift keying (FSK) scheme (e.g., information associated with an amount of transmit power). The communication circuitry 250 may communicate with the wireless power receiver 130 using another frequency different from the specified frequency (e.g., an out-of-band manner). For example, the communication circuitry 250 may transmit the other frequency with information to be transmitted according to a Bluetooth mode, a Bluetooth low energy (BLE) mode, a Wi-Fi mode, a near field communication (NFC) mode, or a Zigbee mode.

The sensing circuitry 260 may detect an amount of transmit power transmitted to the wireless power receiver 130. The amount of transmit power detected by the sensing circuitry 260 may be, for example, an amount of DC power input to the inverter 220 to output AC power to the transmit coil 240.

Referring to FIG. 3, the sensing circuitry 260 may include a resistance element R260 connected in series between the adaptor 210 and the inverter 220 and may detect an amount of transmit current of the wireless power transmitter 200 based on voltages at both ends of the resistance element R260. For example, the sensing circuitry 260 may detect an output voltage level of the adaptor 210 (or a power supply device 110 of FIG. 1), that is, a transmission voltage level. At least a part of the sensing circuitry 260 may be included in the control circuitry 270. For example, the at least part of the sensing circuitry 260 may be an analog digital convertor (ADC) included in the control circuitry 270. The sensing circuitry 260 may include at least one of a temperature sensor capable of sensing temperature or a proximity sensor capable of sensing proximity of the wireless power receiver 130.

The control circuitry 270 may include at least one of, for example, a central processing unit (CPU), a graphic processing unit (GPU), a microprocessor, an application processor, an application specified integrated circuit (ASIC), or field programmable gate arrays (FPGA) and may have a plurality of cores.

When identifying an input associated with transmission of AC power, the control circuitry 270 may output AC power having a specified frequency determined according to the input, using the inverter 220. The input may include a signal output as the control circuitry 270 detects the wireless power receiver 130 which is close to the wireless power transmitter 200 within a specified distance using the sensing circuitry 260. For example, the input may include a request associated with setting an amount of transmit power received from the wireless power receiver 130 (e.g., setting an amount of transmit power according to a specified state). For example, when detecting that the wireless power transmitter 200 is close to the wireless power receiver 130 within the specified distance by means of the sensing circuitry 260, the control circuitry 270 may output AC power having a specified frequency based on the DC power received from the power supply device 110.

The control circuitry 270 may transmit the AC power having the specified frequency to the wireless power receiver 130 using the transmit coil 240.

The control circuitry 270 may calculate an amount of transmit power using the sensing circuitry 260. Referring to FIG. 3, when the sensing circuitry 260 includes the resistance element R260 connected in series between the adaptor 210 and the inverter 220, the control circuitry 270 may receive voltages at both ends of the resistance element R260 via an internal ADC and may calculate an amount of transmit current based on the received voltage. In addition, the control circuitry 270 may calculate a transmission voltage level based on a voltage Vin applied to one end of the resistance element R260. The control circuitry 270 may calculate an amount of transmit power based on the amount of transmit current and the transmission voltage level, detected using the sensing circuitry 260. For example, the control circuitry 270 may multiply the amount of transmit current and the transmission voltage level, detected using the sensing circuitry 260, to calculate the amount of transmit power. Rather than an input power (e.g., DC power) of the inverter 220, the control circuitry 270 may calculate an amount of transmit power based on AC power applied to the transmit coil 240. In addition, the power applied to the transmit coil 240 (i.e., an output power of the inverter 220) may be different from an ideal sine wave, and waveform transformation, waveform distortion, or the like may occur in a situation such as switching frequency control of the inverter 220. Thus, the amount of transmit power calculated based on the AC power may be different from an actual amount of transmit power. In contrast, the amount of transmit power calculated based on the DC power may have higher accuracy than the amount of transmit power calculated based on the AC power.

When transmitting power to the wireless power receiver 130, the control circuitry 270 may generate information associated with an amount of transmit power and may transmit the information associated with the amount of transmit power to the wireless power receiver 130 via the communication circuitry 250. For example, the control circuitry 270 may generate and transmit power information on a periodic basis. For example, the control circuitry 270 may receive a request for information associated with an amount of transmit power from the wireless power receiver 130 and may generate and transmit the information associated with the amount of transmit power in response to the request. The wireless power transmitter 200 may transmit information associated with at least one of a transmission voltage level and an amount of transmit current together with or independently of the information associated with the amount of transmit power.

When receiving a request associated with changing a transmit power (or a request associated with adjusting AC power) from the wireless power receiver 130 via the communication circuitry 250, the control circuitry 270 may change a transmit power state in response to the request. The transmit power state changeable by the control circuitry 270 may include a transmission voltage level. For example, the control circuitry 270 may identify a transmission voltage level to be changed from a request associated with changing the transmit power and may transmit a request to change an output voltage level (correspond to a transmission voltage level) to the power supply device 110. When the adaptor 210 includes a power converter, the control circuitry 270 may transmit a command associated with adjusting a transmission voltage level to the power converter.

While transmitting power to the wireless power receiver 130, the control circuitry 270 may detect an abnormal situation based on at least one of an amount of receive power, an amount of transmit power, or a request received from the wireless power receiver 130 and may stop transmitting power in the abnormal situation. For example, while transmitting the power, the control circuitry 270 may transmit a request associated with an amount of receive power to the wireless power receiver 130 and may receive information, associated with the amount of receive power, as a response to the request from the wireless power receiver 130. The control circuitry 270 may compare the amount of receive power with a specified amount of power. When the amount of receive power is less than or equal to the specified amount of power, the control circuitry 270 may determine a current situation as an abnormal situation and may stop transmitting power. The abnormal situation may include a situation where there are foreign substances which interrupt power transmission between the wireless power transmitter 200 and the wireless power receiver 130, a situation where there is a bad contact between the wireless power transmitter 200 and the wireless power receiver 130, or the like. For example, the control circuitry 270 may receive a request associated with stopping transmitting power, transmitted as the wireless power receiver 130 detects an abnormal situation, and stop transmitting power depending on the request associated with stopping transmitting power. When stopping transmitting power, the control circuitry 270 may at least deactivate the inverter 220. Thus, the control circuitry 270 may prevent the wireless power transmitter 200 from overheating due to power being excessively transmitted in an abnormal situation.

The control circuitry 270 may detect temperature using the sensing circuitry 260. When a detected temperature value is greater than a specified temperature, the control circuitry 270 may reduce an amount of transmit power by a specified rate. The specified rate may be experimentally determined.

Because a wireless power transmitter 120 of FIG. 1 calculates an amount of transmit power based on DC power before converted the DC power into AC power having a specified frequency, the wireless power transmitter 120 may more accurately calculate the amount of transmit power.

The wireless power transmitter 200 may be a portable terminal which further includes a battery and a power management integrated circuit (PMIC). The wireless power transmitter 200 may fail to include the adaptor 210 electrically connected with the power supply device 110. In this case, the battery and the PMIC may perform the function of the power supply device 110. For example, the PMIC may step up or step down DC power from the battery depending on a command of the control circuitry 270 and may supply the stepped-up (or stepped-down) DC power to the inverter 220. For example, when receiving a request associated with changing transmit power from the wireless power receiver 130, the control circuitry 270 may identify a transmission voltage level to be changed from the request associated with changing the transmit power and may transmit a request to change an output voltage level (corresponding to the transmission voltage level) to the PMIC. The PMIC may change an output voltage of the battery in response to the request received from the control circuitry 270 and may output the changed voltage. Thus, a voltage (a transmit voltage) of the changed level may be supplied to the inverter 220.

A wireless power transmitter (e.g., the wireless power transmitter 200 of FIG. 2) may include an inverter (e.g., the inverter 220 of FIG. 2) configured to output AC power using DC power, a coil (e.g., the transmit coil 240 of FIG. 2) configured to receive the AC power, and control circuitry (e.g., the control circuitry 270 of FIG. 2). The control circuitry may be configured to identify an input associated with transmitting the AC power, output AC power having a specified frequency determined according to the input, using the inverter, transmit the AC power to an external electronic device (e.g., the wireless power receiver 400 of FIG. 4) using the coil, and, while at least partially transmitting the AC power to the external electronic device, transmit information associated with an amount of the DC power input to the inverter to output the AC power to the external electronic device, such that the external electronic device identifies transmission efficiency of the AC power using the information associated with the amount of DC power.

The control circuitry may be configured to receive a request associated with adjusting the AC power from the external electronic device based on the information associated with the amount of DC power.

The control circuitry may be configured to adjust a voltage level of the DC power in response to the request associated with adjusting the AC power.

The control circuitry may be configured to transmit information associated with an amount of current of the DC power using a frequency different from the specified frequency via the coil.

The wireless power transmitter may further include a communication circuitry (e.g., the communication circuitry 250 of FIG. 2) configured to communicate with the external electronic device. The control circuitry may be configured to transmit information associated with an amount of current of the DC power via the communication circuitry.

Figure 4:
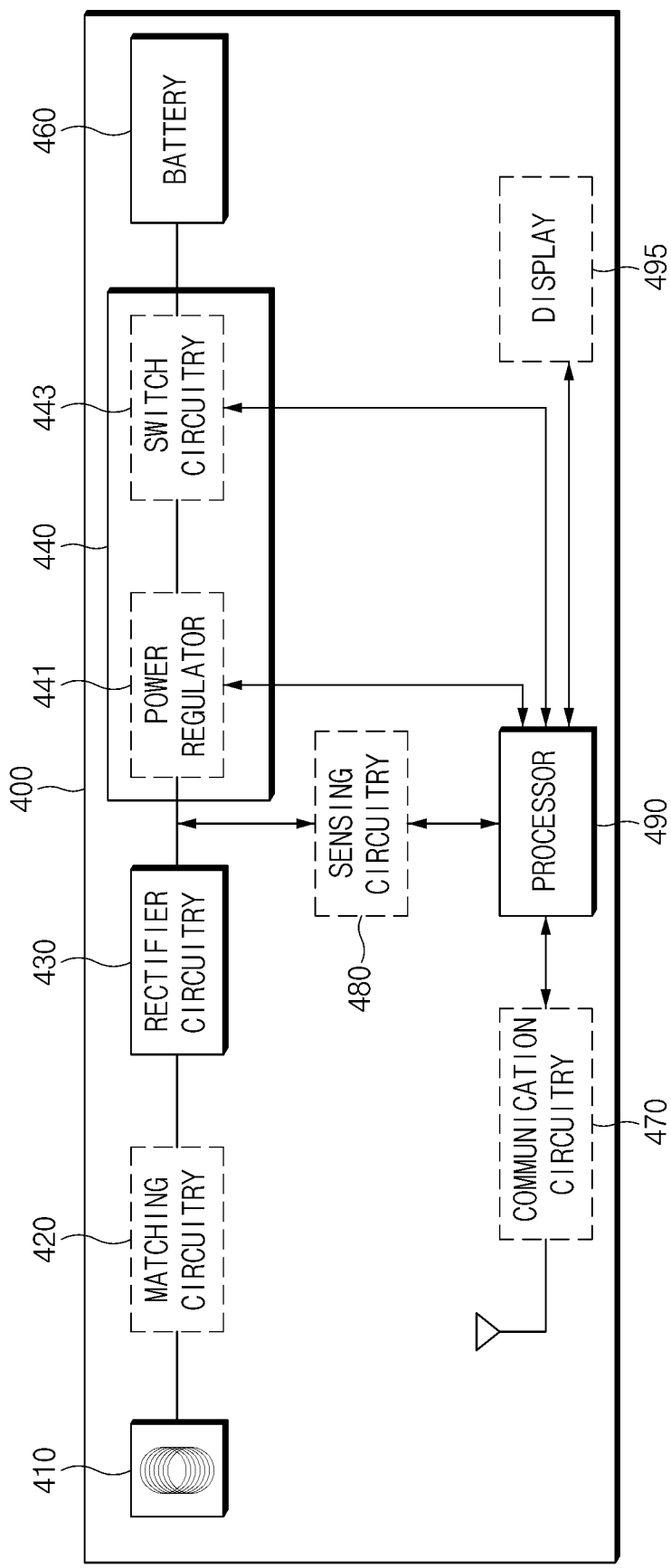
FIG. 4 is a block diagram of a wireless power receiver (e.g., a wireless power receiver of FIG. 1), according to an embodiment.

FIG. 4 is a block diagram illustrating a configuration of a wireless power receiver 400 according to an embodiment.

Referring to FIG. 4, the wireless power receiver 400 includes a receive coil 410, matching circuitry 420, rectifier circuitry (e.g., conversion circuitry) 430, charging circuitry 440, a battery 460, communication circuitry 470, sensing circuitry 480, and a processor 490. The wireless power receiver 400 may fail to include some components or may further include an additional component. For example, when the wireless power receiver 400 communicates with a wireless power transmitter (e.g., the wireless power transmitter 200 of FIG. 2) using the receive coil 410, the communication circuitry 470 may be omitted. For example, the wireless power receiver 400 may further include a display 495. Some of the components of the wireless power receiver 400 may be combined into one entity and may perform functions of the components before the combination in the same manner. For example, the matching circuitry 420 may be included in the receive coil 410, and the sensing circuitry 480 may be included in the processor 490.

The receive coil 410 may receive AC power having a specified frequency from the wireless power transmitter 200. For example, the receive coil 410 may receive the AC power having the specified frequency in a magnetic induction scheme. The receive coil 410 may receive the AC power having the specified frequency in a magnetic resonance scheme.

The matching circuitry 420 may match impedance with a matching circuitry 230 of the wireless power transmitter 200.

The rectifier circuitry 430 may rectify the AC power having the specified frequency received via the receive coil 410 to convert the AC power having the specified frequency into DC power.

The charging circuitry 440 may charge the battery 460 using the DC power. The charging circuitry 440 may be implemented using at least a part of a PMIC. The charging circuitry 440 may include a power regulator 441 and switch circuitry 443.

The power regulator 441 may receive the DC power output from the rectifier circuitry 430 and may convert a voltage level of the received DC power. The voltage regulator 441 may include, for example, a DC/DC converter capable of changing a voltage level of the received DC power depending on a first control signal from the processor 490.

The switch circuitry 443 may receive the DC power output from the power regulator 441 and may supply at least a portion of an amount of current of the received DC power (an amount of receive power) to the battery 460. The switch circuitry 443 may supply the amount of receive power according to a second control signal received from the processor 490 to the battery 460. The switch circuit 443 may be implemented using at least a part of the PMIC.

The battery 460 may be charged using the DC power received via the switch circuitry 443. The battery 460 may be charged with a constant current or a constant voltage according to a voltage level of the battery 460 in a charging process.

The communication circuitry 470 may mediate communication between the processor 490 and the wireless power transmitter 200. For example, the communication circuitry 470 may convert a signal received from the processor 490 into a signal corresponding to a specified communication mode and may transmit the converted signal to the wireless power transmitter 200 over a specified communication channel. Alternatively, the communication circuitry 470 may convert the signal received from the wireless power transmitter 200 over the specified communication channel into a signal analyzable by the processor 490 and may transmit the converted signal to the processor 490. The communication circuitry 470 may communicate with the wireless power transmitter 200 using a specified frequency (e.g., in an in-band manner). For example, the communication circuitry 470 may transmit the specified frequency with information to be transmitted in an amplitude shift keying (ASK) scheme. The communication circuitry 470 may communicate with the wireless power transmitter 200 using another frequency except for the specified frequency (e.g., in an out-band manner). For example, the communication circuitry 470 may transmit another frequency according to a Bluetooth mode, a BLE mode, a Wi-Fi mode, an NFC mode, or a Zigbee mode with information to be transmitted.

The sensing circuitry 480 may detect an amount of power (an amount of receive power) received from the wireless power receiver 200. For example, the sensing circuitry 480 may include a resistance element connected in series between a power output of the rectifier circuitry 430 and the power regulator 441 and may detect the amount of receive power based on voltages at both ends of the resistance element. For example, the sensing circuitry 480 may detect a voltage level of an output of the rectifier circuitry 430, that is, a reception voltage level. At least a part of the sensing circuitry 480 may be included in the processor 490. For example, the at least part of the sensing circuitry 480 may be an ADC included in the processor 490. The sensing circuitry 480 may detect at least one of a reception voltage level and an amount of receive current using at least one of an output of the power regulator 441 or an output of the switch circuitry 443. Alternatively, the sensing circuitry 480 may fail to separately detect the reception voltage level and the amount of receive current.

The processor 490 may include at least one of, for example, a CPU, a GPU, a microprocessor, an application processor, an ASIC, or FPGAs and may have a plurality of cores.

When detecting the wireless power transmitter 200 using the sensing circuitry 480, the processor 490 may set a power state including an amount of current and a voltage level associated with charging the battery 460 to a specified state, using the charging circuitry 440. The specified state may be a state (e.g., a default state) before the power state is adjusted according to reception efficiency. The power state associated with charging the battery 460 may include at least one of a voltage level of DC power (hereinafter referred to as reception voltage level), adjusted using the power regulator 441, and an amount of (charging) current (hereinafter referred to as amount of receive current), supplied to the battery 460 via the switch circuitry 443. For example, the processor 490 may identify a reception voltage level according to the specified state and may set a reception voltage level—a level of an output voltage of the power regulator 441—to correspond to the identified voltage level, using the power regulator 441. Furthermore, the processor 490 may identify an amount of receive current according to the specified state and may set an amount of current of DC power—an amount of current supplied from the switch circuitry 443 to the battery 460—to correspond to the identified amount of current, using the switch circuitry 443.

The processor 490 may receive the AC power corresponding to the specified state from the wireless power transmitter 200 via the receive coil 410 and may convert the AC power into DC power using the rectifier circuitry 430 (the conversion circuitry). While at least partially charging the battery 460 using the DC power by means of the charging circuitry 440, the processor 490 may receive information associated with an amount of transmit power transmitted from the wireless power transmitter 200 to the wireless power receiver 400. For example, the processor 490 may request the wireless power transmitter 200 to transmit information associated with an amount of transmit power and may receive the information, associated with the amount of transmit power, in response to the request. For example, the processor 490 may receive information associated with an amount of transmit power periodically transmitted by the wireless power transmitter 200.

The processor 490 may identify the amount of transmit power from the information associated with the amount of transmit power and may calculate reception efficiency based at least in part on the amount of transmit power. For example, when the amount of transmit power is about 10 Watts (i.e., 10 W) and when the amount of receive power is about 8 W, the processor 490 may calculate about 80%, which is a percentage of the amount of receive power to the amount of transmit power, as reception efficiency. The processor 490 may identify an amount of receive current and a reception voltage level using the sensing circuitry 480 and may calculate an amount of receive power based on the amount of receive current and the reception voltage level. For example, the processor 490 may multiply the amount of receive current and the reception voltage level to calculate the amount of receive power. Alternatively, the processor 490 may identify an amount of receive power corresponding to a setting of the power regulator 441 and a setting of the switch circuitry 443. For example, the processor 490 may identify a reception voltage level (an output voltage level) according to the setting of the power regulator 441 and an amount of receive current (an amount of output current) according to the setting of the switch circuit 443 as an amount of receive power. The wireless power receiver 400 may calculate reception efficiency based on an amount of transmit power calculated based on DC power by the wireless power transmitter 200, thus enhancing accuracy of the calculated reception efficiency.

The processor 490 may adjust a power state of the charging circuitry 440 to another specified state based at least in part on the calculated efficiency. In adjusting the power state to the other specified state, the processor 490 may adjust at least one of a reception voltage level or an amount of receive current, such that the amount of receive power is changed within a specified error range. The specified error range may be an error range (e.g., about ±0.5 W) capable of being used to determine that the amount of receive power is not changed. For example, while maintaining the amount of receive power within the specified error range, the processor 490 may adjust (e.g., step up or step down) a reception voltage level using the power regulator 441 such that reception efficiency may be increased or may adjust (e.g., increase or decrease) an amount of receive current using the switch circuitry 443 such that the reception efficiency may be enhanced. In adjusting the power state, the processor 490 may transmit a request associated with changing a transmit power to the wireless power transmitter 200 via the communication circuitry 470 based on the reception efficiency. When receiving the request associated with changing the transmit power, the wireless power transmitter 200 may change an amount of transmit power (e.g., a transmission voltage level). The processor 490 may fail to adjust a power state when the calculated reception efficiency is greater than a first specified efficiency (e.g., about 80%) and may adjust the power state only when the calculated reception efficiency is less than or equal to the first specified efficiency.

The processor 490 may recalculate the reception efficiency in the state where the power state is adjusted to the other specified state and may adjust the power state of the charging circuitry 440 to one corresponding to a state with higher reception efficiency between the specified state or the other specified state.

When adjusting the power state, the processor 490 may calculate reception efficiency a specified number of times while adjusting (e.g., changing) the power state the specified number of times (e.g., at least once) and may determine a power state with the calculated highest reception efficiency among the changed or adjusted power states.

When adjusting the power state, the processor 490 may change the power state and calculate reception efficiency to compare the current reception efficiency with previous reception efficiency. When the current reception efficiency is less than or equal to the previous reception efficiency, the processor 490 may restore the power state to a previous power state and may charge the battery 460. On the other hand, when the current reception efficiency is greater than the previous reception efficiency, the processor 490 may re-adjust the power state.

When determining the power state based on the reception efficiency, the processor 490 may set a power state associated with charging the battery 460 to the determined state and may charge the battery 460. For example, the processor 490 may set the power state to the determined state using the power regulator 441 and the switch circuitry 443. For example, as the processor 490 transmits a request associated with changing a transmit power corresponding to the determined state to the wireless power transmitter 200, the processor 490 may set the transmit power as the determined state.

The processor 490 may adjust (e.g., control) a power state (e.g., power) associated with charging the battery 460 at least once in a constant current charging mode in the process of charging the battery 460. The constant current charging mode may be, for example, a mode where an amount of receive power is set in a fixed manner. The processor 490 may adjust a power state associated with charging the battery 460 in a constant voltage charging mode. In this case, because the amount of receive power is varied, the processor 490 may adjust the power state in response to the varied amount of receive power.

While the battery 460 is charged, the processor 490 may detect an abnormal situation based on the above-described reception efficiency. When detecting the abnormal state, the processor 490 may block a power receive path or may deactivate components associated with only the charging of the battery 460. When detecting the abnormal situation, the processor 490 may output a screen for informing a user of the abnormal situation using the display 495. The abnormal situation may include, for example, a situation where there are foreign substances interrupting power transmission between the wireless power transmitter 200 and the wireless power receiver 400, a situation where there is a bad contact between the wireless power transmitter 200 and the wireless power receiver 400, or the like. For example, when the reception efficiency is less than or equal to a second specified efficiency, the processor 490 may deactivate the power regulator 441 and the switch circuitry 443 to block power supplied to the battery 460. The second specified efficiency (e.g., 50%) may be efficiency of less than the first specified efficiency and may be a threshold for detecting an abnormal situation of the wireless power receiver 200. Furthermore, the processor 490 may transmit a request associated with stopping transmitting power to the wireless power transmitter 200 via the communication circuitry 470. When receiving the request associated with stopping transmitting power, the wireless power transmitter 200 may stop transmitting power to the wireless power receiver 400 in response to the request. Thus, the processor 490 may detect the abnormal situation itself independently of whether the wireless power transmitter 200 detects the abnormal situation, thus, preventing the wireless power transmitter 200 from overheating in the abnormal situation.

The wireless power receiver 400 including the higher-performance processor 490 than the wireless power transmitter 200 may actively perform power control (e.g., power state adjustment) for enhancing reception efficiency, thus, increasing processing performance of the power control.

While changing an amount of transmit power associated with charging the battery 460 and a receive power state (e.g., a reception voltage level and an amount of receive current), the wireless power receiver 400 may control reception efficiency, thus, diversifying processing for enhancing the reception efficiency.

A wireless power receiver (e.g., the wireless power receiver 400 of FIG. 4) may include a battery (e.g., the battery 460 of FIG. 4), a coil (e.g., the receive coil 410 of FIG. 4) configured to receive AC power wirelessly transmitted by an external electronic device (e.g., the wireless power transmitter 200 of FIG. 2), conversion circuitry (e.g., the rectifier circuitry 430 of FIG. 4) configured to convert the AC power received via the coil into DC power, charging circuitry (e.g., the charging circuitry 440 of FIG. 4) configured to charge the battery using the DC power, and a processor (e.g., the processor 490 of FIG. 4). The processor may be configured to, when detecting the external electronic device, set a power state including an amount of current and a voltage level associated with charging the battery to a specified state, using the charging circuitry, receive the AC power corresponding to the specified state from the external electronic device via the coil, convert the AC power into DC power using the conversion circuitry, while at least partially charging the battery using the DC power by means of the charging circuitry, receive information associated with an amount of transmit power transmitted from the external electronic device to the wireless power receiver, calculate reception efficiency based at least in part on the amount of transmit power and an amount of receive power received from the external electronic device, and adjust a power state of the charging circuitry to another specified state based at least in part on the reception efficiency.

The processor may be configured to transmit a request for the information associated with the amount of transmit power to the external electronic device via the coil and receive the information associated with the amount of transmit power as a response to the request from the external electronic device.

The wireless power receiver may further include communication circuitry (e.g., the communication circuitry 470 of FIG. 4) configured to communicate with the external electronic device. The processor may be configured to transmit a request for the information associated with the amount of transmit power to the external electronic device via the communication circuitry and receive the information associated with the amount of transmit power as a response to the request from the external electronic device.

The processor may be configured to adjust at least one of the voltage level or the amount of current, such that the amount of receive power is changed within a specified range, as at least a part of adjusting the power state to the other specified state.

The processor may be configured to transmit a request associated with changing the amount of transmit power to the external electronic device, such that the external electronic device changes the amount of transmit power, as at least a part of adjusting the power state to the other specified state.

The processor may be configured to recalculate the reception efficiency in the state where the power state is adjusted to the other specified state and adjust the power state of the charging circuitry to one corresponding to a state with higher reception efficiency between the specified state or the other specified state.

The processor may be configured to, when charging the battery with a constant current, calculate the reception efficiency at least once.

The processor may be configured to, when the reception efficiency is less than equal to specified efficiency, block the DC power with which the battery is charged using the charging circuitry.

FIG. 5 is an illustration of an information packet associated with an amount of transmit power according to an embodiment.

A wireless power transmitter 200 of FIG. 2 may transmit information associated with an amount of transmit power a plurality of times. Referring to FIG. 5, the wireless power transmitter 200 may first transmit an information packet 510 associated with a maximum amount of power indicating a maximum value (e.g., 255) of an information packet 520 associated with an amount of transmit power and may subsequently transmit the information packet 520 associated with the amount of transmit power corresponding to a real amount of transmit power. In this case, a wireless power receiver 400 of FIG. 4 may divide a value obtained by multiplying a first value included in the information packet 510 associated with the maximum amount of power by a second value included in the information packet 520 associated with the amount of transmit power by a total bit number n (e.g., n=8 in FIG. 5) of the information packets 510 and 520 to calculate an amount PT of transmit power as in Equation (1) below. Thus, the wireless power transmitter 400 may transmit an amount of transmit power in finer units than the number of bits of the information packets 510 and 520.

$$P_T = \frac{firs\ value}{2^n} \times second\ value \quad (1)$$

The manner in which the wireless power transmitter 200 transmits the amount of transmit power is not limited thereto. For example, the wireless power transmitter 200 may convert the amount of transmit power into 16-bit data, first transmit an information packet including upper bits of the 16-bit data, and subsequently transmit an information packet including lower bits of the 16-bit data. The wireless power transmitter 200 may transmit at least one of a transmission voltage level or an amount of transmit current independently of the amount of transmit power or together with the amount of transmit power.

Figure 6:
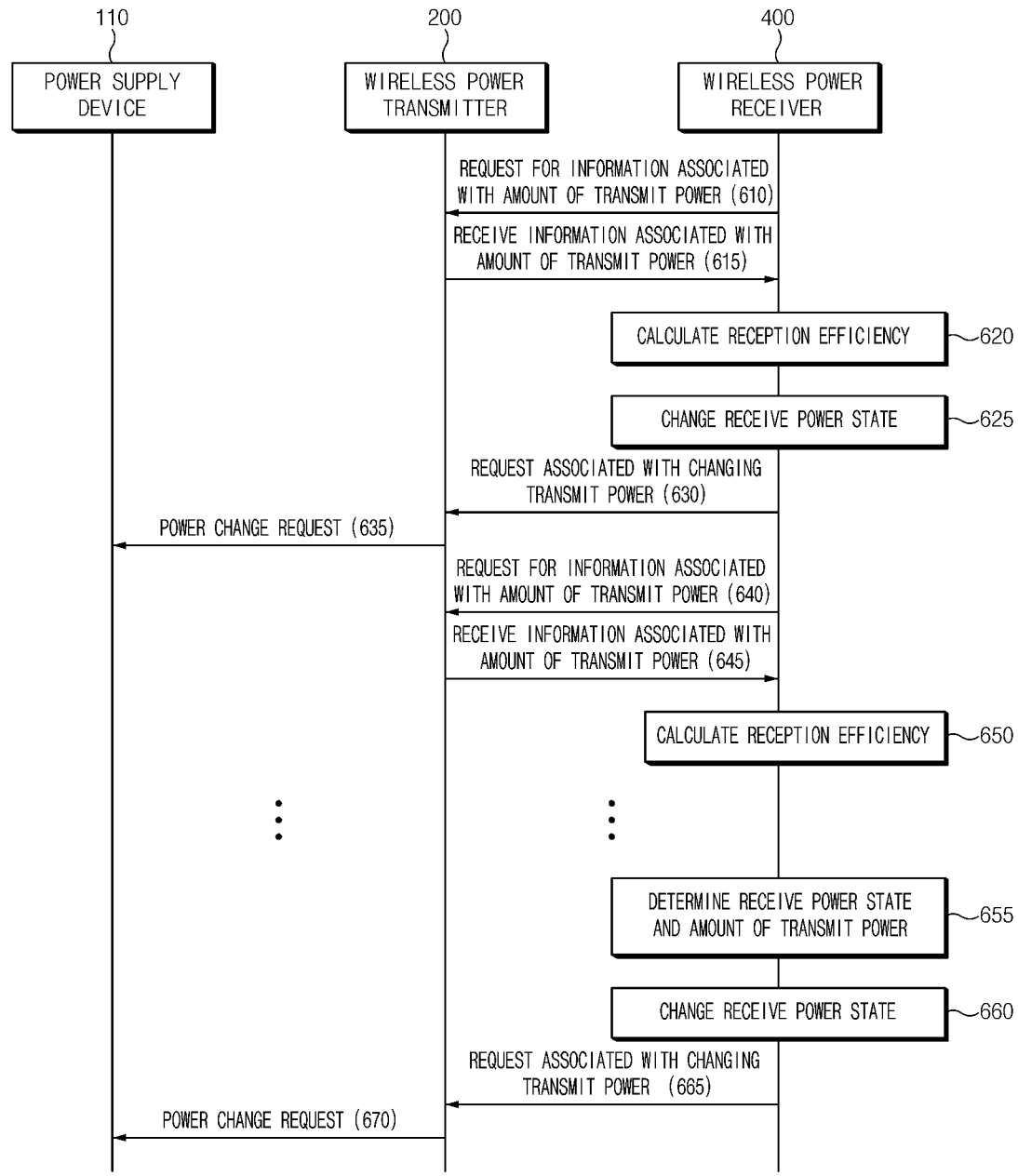
FIG. 6 is a signal sequence diagram illustrating a power control method of a wireless power transfer system, according to an embodiment.

FIG. 6 is a signal sequence diagram illustrating a power control method of a wireless power transfer system according to an embodiment.

Referring to FIG. 6, when a wireless power transmitter 200 and a wireless power receiver 400 can establish a communication channel or when the wireless power transmitter 200 and the wireless power receiver 400 are within a specified distance of each other, in operation 610, the wireless power receiver 400 may transmit a request for information associated with an amount of transmit power.

In operation 615, the wireless power transmitter 200 transmits the information, associated with the amount of transmit power, in response to the request for the information associated with the amount of transmit power received in operation 610 from the wireless power receiver 400. The information associated with the amount of transmit power may include at least one of, for example, the amount of transmit power or an amount of transmit current or a transmission voltage level, which corresponds to the amount of transmit power.

In operation 620, the wireless power receiver 400 calculates reception efficiency based on the amount of transmit power. For example, the wireless power receiver 400 may calculate reception efficiency which is a percentage of an amount of receive power to the amount of transmit power.

In operation 625, the wireless power receiver 400 adjusts (e.g., change) a receive power state (corresponding to the above-mentioned power state associated with charging a battery 460 of FIG. 4) based on the calculated reception efficiency. For example, the wireless power receiver 400 may adjust at least one of a reception voltage level or an amount of receive current. A description is provided below of a form where the wireless power receiver 400 adjusts the receive power state.

In operation 630, the wireless power receiver 400 transmits a request associated with changing a transmit power to the wireless power transmitter 200. The request associated with changing the transmit power may include, for example, a request causing the wireless power transmitter 200 to adjust (e.g., step up or down) a transmission voltage level. A description is provided below of a form where the wireless power transmitter 200 adjusts (e.g., changes) a transmit power.

When receiving the request associated with changing the transmit power, in operation 635, the wireless power transmitter 200 transmits a command (or a control signal) causing a power supply device 110 to adjust a transmission voltage level to the power supply device 110.

In operation 640, the wireless power receiver 400 transmits a transmit power change request and may transmit a request for information associated with an amount of transmit power. The request for the information may be a request for an amount of transmit power changed according to the request associated with changing the transmit power.

In operation 645, the wireless power transmitter 200 transmits information associated with an amount of transmit power corresponding to the changed amount of transmit power to the wireless power receiver 400 in response to the request received in operation 640.

In operation 650, the wireless power receiver 400 calculates reception efficiency based on the amount of transmit power.

In operation 655, the wireless power receiver 400 determines a receive power state and a transmit power state, corresponding to the highest reception efficiency among a plurality of calculated reception efficiency.

In operation 660, the wireless power receiver 400 adjusts (e.g., change) a receive power state to correspond to the determined power state.

In operation 665, the wireless power receiver 400 transmits a request associated with changing a transmit power according to the determined amount of transmit power. The request may be a request causing the wireless power transmitter 200 to change an amount of transmit power depending on the determined amount of transmit power.

When receiving the request associated with changing the transmit power, in operation 670, the wireless power transmitter 200 transmits a command (or a control signal) causing the power supply device 110 to adjust a supply voltage level (a transmission voltage level).

The wireless power receiver 400 adjusts (e.g., change) the receive power state or the amount of transmit power at least once more between operations 650 and 655. Furthermore, the pattern where the wireless power receiver 400 changes the receive power state or the amount of transmit power is not limited to the above-mentioned embodiments. For example, the wireless power receiver 400 may determine a receive power state with the best reception efficiency while adjusting the receive power state and may determine an amount of transmit power with the best reception efficiency while adjusting the amount of transmit power.

Figure 7:
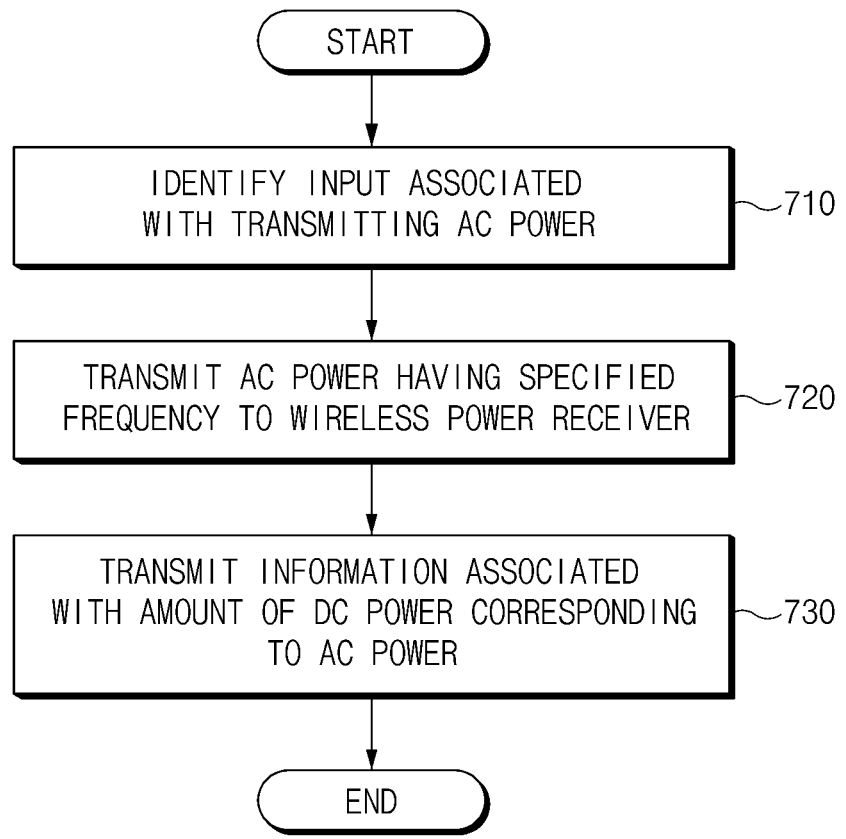
FIG. 7 is a flowchart illustrating a power control method by a wireless power transmitter, according to an embodiment.

FIG. 7 is a flowchart illustrating a power control method by a wireless power transmitter 200 according to an embodiment.

Referring to FIG. 7, in operation 710, the wireless power transmitter 200 identifies an input associated with transmitting AC power. The input may be to receive, for example, a signal output as sensing circuitry (e.g., the sensing circuitry 260 of FIG. 2) included in the wireless power transmitter 200 detects a wireless power receiver 400 which is close to the wireless power transmitter 200 within a specified distance. For example, the input may include a request associated with setting an amount of transmit power received from the wireless power receiver 400 (e.g., setting an amount of transmit power according to a specified state).

In operation 720, when identifying the input, the wireless power transmitter 200 transmits AC power having a specified frequency to the wireless power receiver 400. The wireless power transmitter 200 may output the AC power having the specified frequency using an inverter 220 of FIG. 2 and may transmit the AC power having the specified frequency to the wireless power receiver 400 using a transmit coil 240 of FIG. 2.

In operation 730, the wireless power transmitter 200 transmits information associated with an amount of DC power corresponding to the AC power. The amount of DC power may include, for example, an amount of DC power input to the inverter 220 to output AC power to the transmit coil 240 by the inverter 220.

Figure 8:
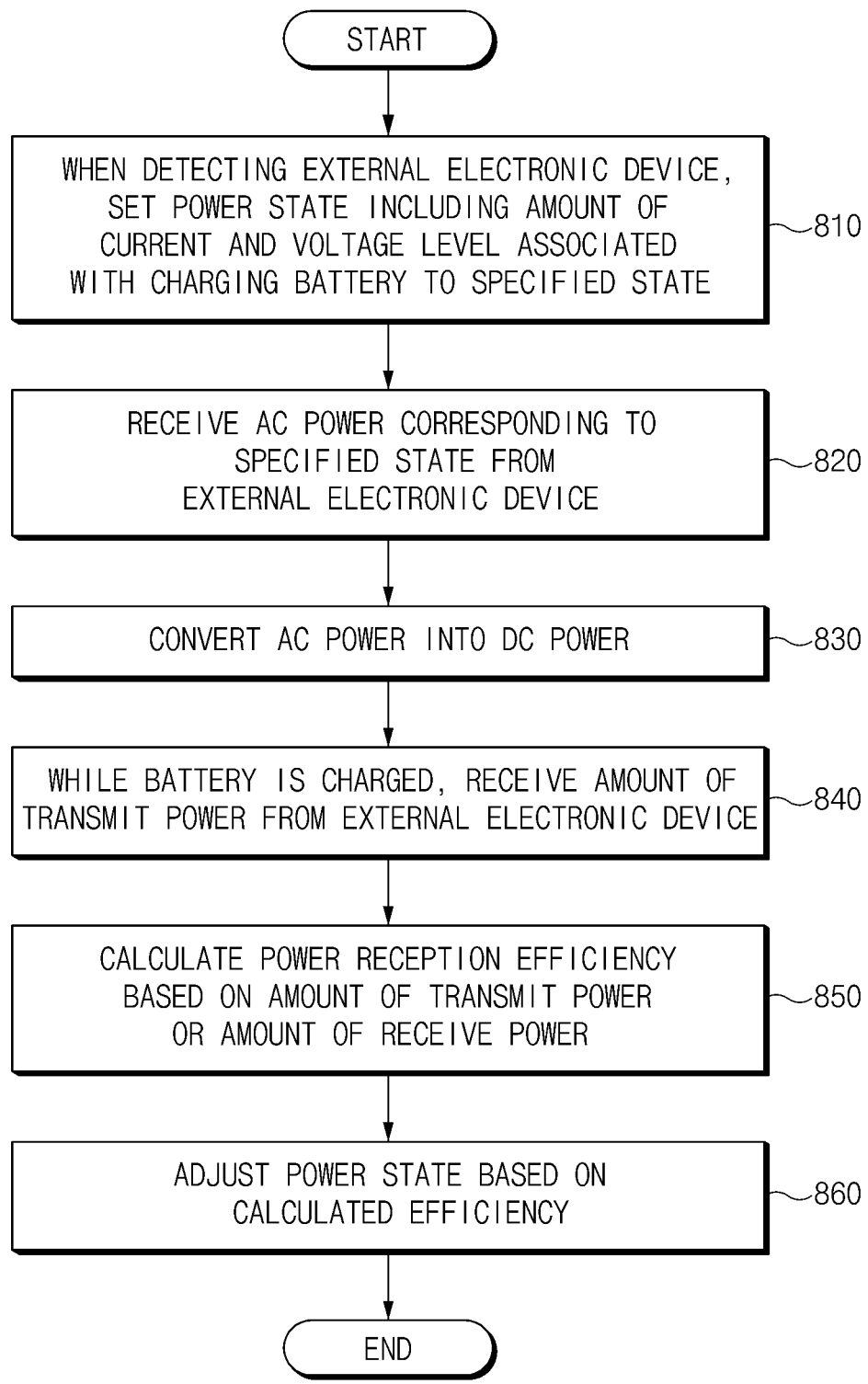
FIG. 8 is a flowchart illustrating a power control method by a wireless power receiver, according to an embodiment.

FIG. 8 is a flowchart illustrating a power control method by a wireless power receiver 400 according to an embodiment.

Referring to FIG. 8, in operation 810, when detecting an external electronic device (e.g., the wireless power transmitter 200 of FIG. 2), the wireless power receiver 400 sets a power state including an amount of current and a voltage level associated with charging a battery 460 of FIG. 4 to a specified state. The specified state may be a state (e.g., a default state) before a power state is adjusted according to reception efficiency. The specified state may be, for example, a state where a reception voltage level is set to about 10 V, where an amount of receive current is set to about 0.9 V, or where a transmission voltage level is set to about 9 V.

In operation 820, the wireless power receiver 400 receives AC power corresponding to the specified state from a wireless power transmitter 200 of FIG. 2 (e.g., an external electronic device) via a receive coil 410 of FIG. 4.

In operation 830, the wireless power receiver 400 converts the AC power into DC power using the rectifier circuitry 430 (e.g., conversion circuitry).

In operation 840, while at least partially charging the battery 460 using the DC power by means of the charging circuitry 440 of FIG. 4, the wireless power receiver 400 receives information associated with an amount of transmit power transmitted from the wireless power transmitter 200 (e.g., an external electronic device) to the wireless power receiver 400.

In operation 850, the wireless power receiver 400 calculates reception efficiency based at least in part on the amount of transmit power and an amount of receive power received from the wireless power transmitter 200. For example, the wireless power receiver 400 may calculate reception efficiency based on a detected or calculated amount of receive power.

In operation 860, the wireless power receiver 400 adjusts a power state of the charging circuitry 440 to another specified state based at least in part on the calculated reception efficiency. For example, a processor 490 of FIG. 4 may adjust a power state (or a receive power state) associated with charging the battery 460 to enhance the reception efficiency. Additionally or alternatively, the processor 490 may request the wireless power transmitter 200 to adjust an amount of transmit power (e.g., a transmission voltage level) to enhance reception efficiency.

A power control method by a wireless power receiver (e.g., the wireless power receiver 400 of FIG. 4) may include, when detecting an external electronic device (e.g., the wireless power transmitter 200 of FIG. 2), setting a power state including an amount of current and a voltage level associated with charging a battery (e.g., the battery 460 of FIG. 4) to a specified state, receiving AC power corresponding to the specified state from the external electronic device via a coil (e.g., the receive coil 410 of FIG. 4), converting the AC power into DC power using a conversion circuitry (e.g., the rectifier circuitry 430 of FIG. 4), while at least partially charging the battery using the DC power by means of a charging circuitry (e.g., the charging circuitry 440 of FIG. 4), receiving information associated with an amount of transmit power transmitted from the external electronic device to the wireless power receiver, calculating reception efficiency based on the amount of transmit power and an amount of receive power received from the external electronic device, and adjusting a power state of the charging circuitry to another specified state based at least in part on the reception efficiency.

The receiving may include transmitting a request for information associated with the amount of transmit power to the external electronic device via the coil and receiving the information associated with the amount of transmit power as a response to the request from the external electronic device.

At least a part of adjusting the power state to the other specified state may include adjusting at least one of the voltage level or the amount of current such that the amount of receive power is changed within a specified error range.

At least a part of adjusting the power state to the other specified state may include transmitting a request associated with changing the amount of transmit power to the external electronic device, such that the external electronic device changes the amount of transmit power.

The adjusting of the power state to the other specified state may include recalculating the reception efficiency in the state where the power state is adjusted to the other specified state and adjusting the power state of the charging circuitry to one corresponding to a state with higher reception efficiency between the specified state or the other specified state.

The calculating of the reception efficiency may be performed at least once when the battery is charged with a constant current.

The power control method may further include, when the reception efficiency is less than or equal to a specified efficiency, blocking the DC power with which the battery is charged using the charging circuitry.

Hereinafter, a description is provided of a change in reception efficiency according to a receive power state or a transmit power state according to an embodiment with reference to FIGS. 9 to 13.

Figure 9:
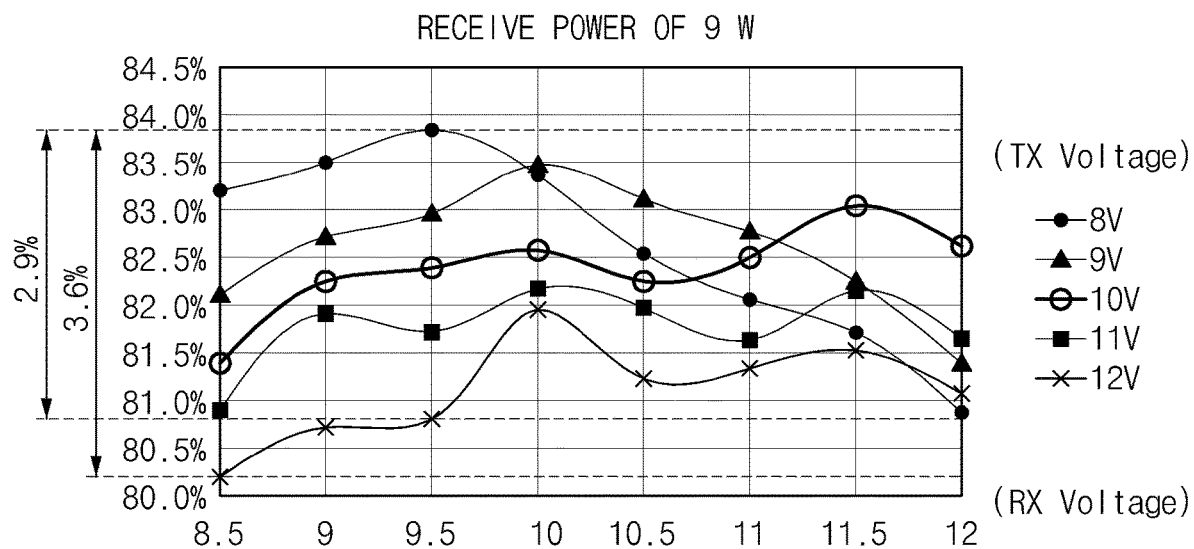
FIG. 9 is a graph and a table illustrating changes in transmission efficiency when an amount of receive power consumed by a wireless power receiver is 9 W, according to an embodiment.
Figure 10:
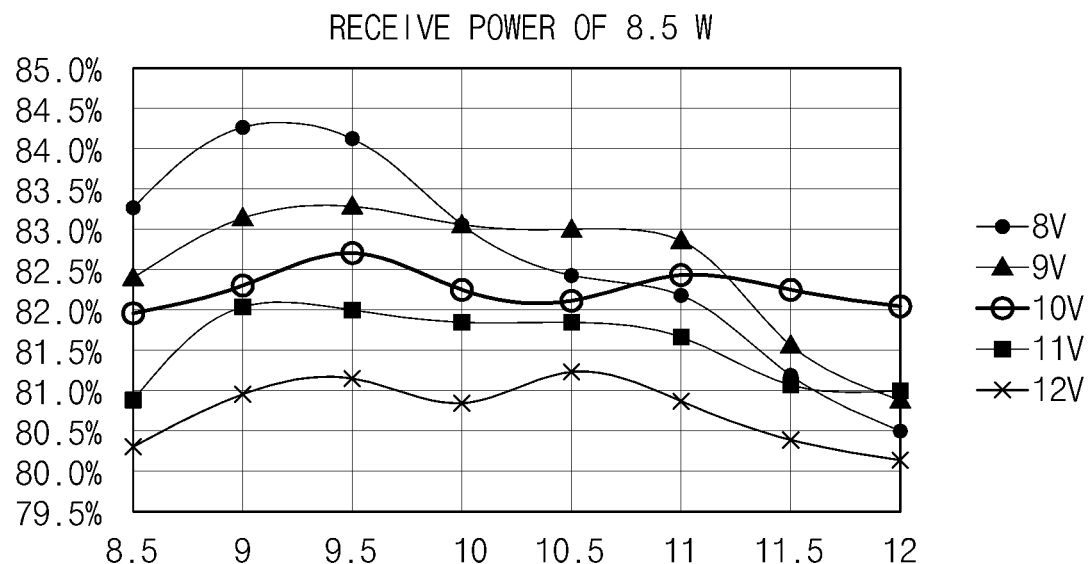
FIG. 10 is a graph illustrating changes in transmission efficiency when an amount of receive power is 8.5 W, according to an embodiment.
Figure 11:
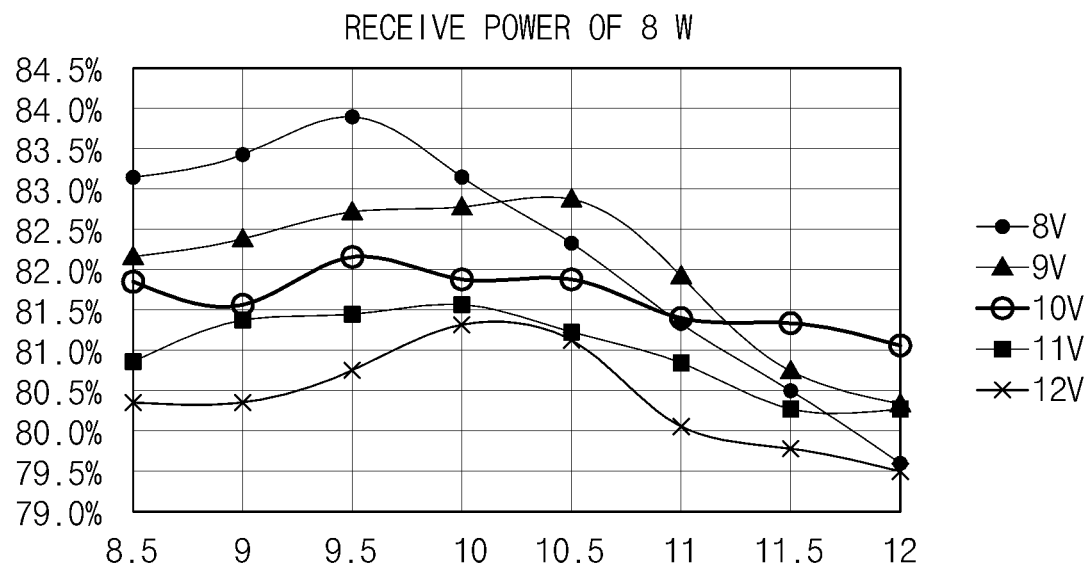
FIG. 11 is a graph illustrating changes in transmission efficiency when an amount of receive power is 8 W, according to an embodiment.
Figure 12:
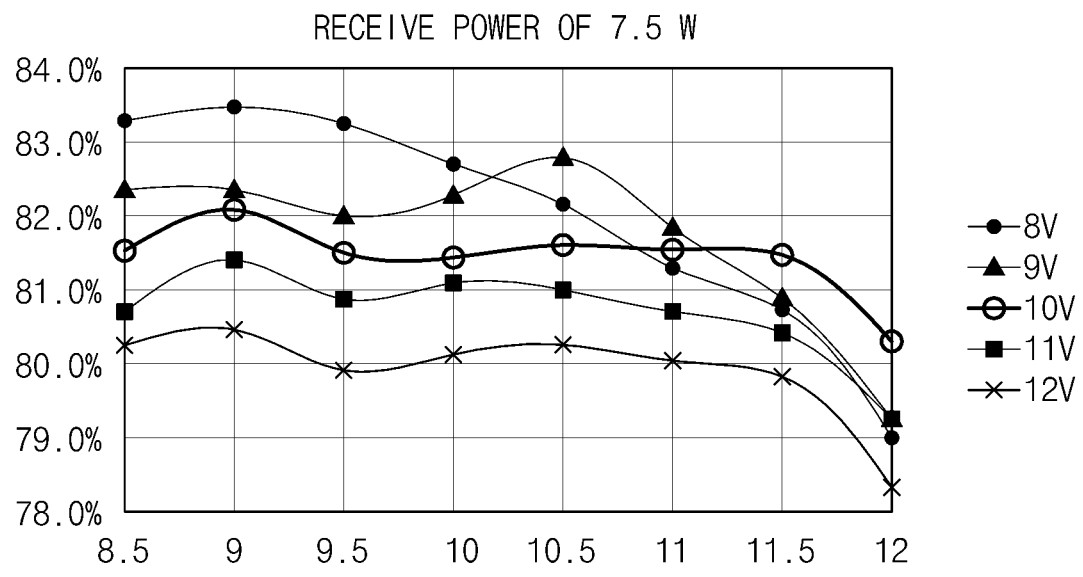
FIG. 12 is a graph illustrating changes in transmission efficiency when an amount of receive power is 7.5 W, according to an embodiment.
Figure 13:
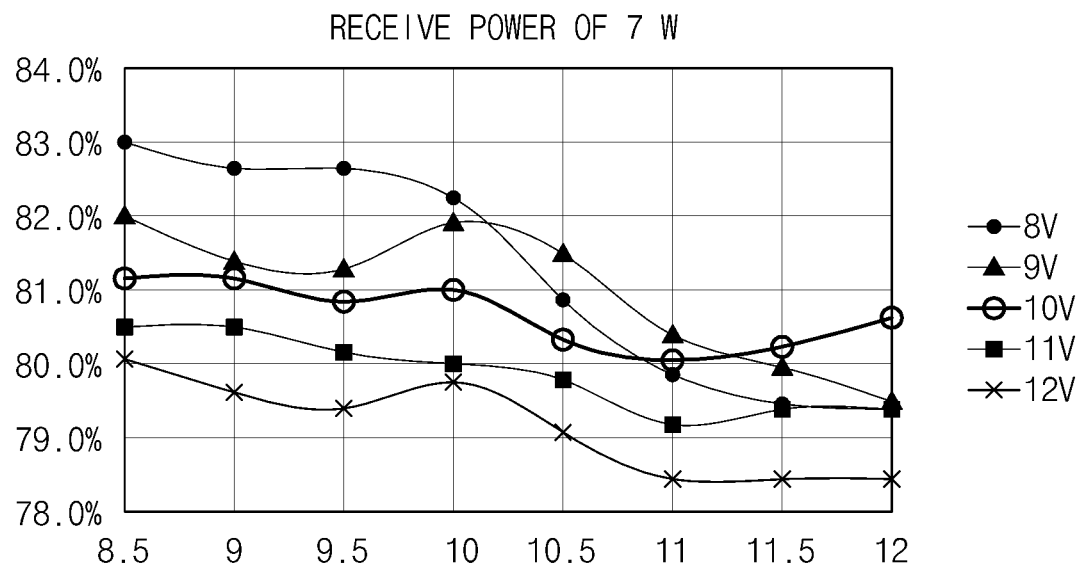
FIG. 13 is a graph illustrating changes in transmission efficiency when an amount of receive power is 7 W, according to an embodiment.

FIG. 9 is a graph and a table illustrating changes in transmission efficiency when an amount of receive power consumed by a wireless power receiver is 9 W, according to an embodiment. The table in FIG. 9 indicates reception voltage levels and transmission voltage levels, corresponding to respective points (e.g., ○, ●, ▲, ■, x) of the graph in FIG. 9, in numeric values.

When an amount of receive power consumed by the wireless power receiver 400 of FIG. 4 is about 9 W, reception efficiency may vary with a reception voltage level RX of the wireless power receiver 400 or a transmission voltage level TX of the wireless power transmitter 200 of FIG. 2. For example, referring to a third row of the in FIG. 9, in a state where the transmission voltage level is set to about 8 V, reception efficiency of about 80.9% when the reception voltage level is about 12 V and reception efficiency of about 83.8% when the reception voltage level is about 0.5 V have a difference of about 2.9%. For example, referring to an eighth column of the table in FIG. 9, in a state where the reception voltage level is set to about 9.5 V, there is a difference of about 3% between reception efficiency of about 83.8% when the transmission voltage level is set to about 8 V and reception efficiency of about 80.8% when the transmission voltage level is set to about 12 V.

When an amount of receive power consumed by the wireless power receiver 400 is about 9 W, reception efficiency may vary with the reception voltage level RX of the wireless power receiver 400 and the transmission voltage level TX of the wireless power transmitter 200. For example, the highest reception efficiency of about 83.8% (reception efficiency when the reception voltage level is set to about 9.5 V and when the transmission voltage level is set to about 8 V) may be greater than the lowest reception efficiency of about 80.2% (reception efficiency when the reception voltage level is set to about 8.5 V and when the transmission voltage level is set to about 12 V) by about 3.6%. The wireless power receiver 400 may optimize reception efficiency by adjusting a transmit power state and a receive power state.

FIGS. 10, 11, 12, and 13 are graphs illustrating changes in reception efficiency when amounts of receive power are about 8.5 W, 8 W, 7.5 W, and 7 W, according to an embodiment.

Referring to FIGS. 10, 11, 12, and 13, although an amount of receive power of the wireless power receiver 400 of FIG. 4 is another amount of power (e.g., although the amounts of power are about 8.5 W, 8 W, 7.5 W, and 7 W), it is identified that reception efficiency varies with a transmission voltage level set in the wireless power receiver 400 and a reception voltage level set in the wireless power transmitter 200 of FIG. 2.

Hereinafter, a description is provided of various control methods when the amount of receive power of the wireless power receiver 400 is about 9 W.

Table 1 below is an example of power control for adjusting a receive power state in a state where a transmission voltage level is fixed according to an embodiment.

(e.g., a default state) before a power state is adjusted according to reception efficiency. The specified state may be a state where the reception voltage level is set to about 10 V, where the amount of receive current is set to 0.9 A, and where the transmission voltage level is about 9 V. The wireless power transmitter 200 may transmit a request for information associated with an amount of transmit power and may receive the information associated with the amount of transmit power as a response to the request. For example, the wireless power receiver 400 may set the reception voltage level to about 10 V using the power regulator 411 of FIG. 4 and may set the amount of receive current to about 0.9 A using the switch circuit 441 of FIG. 4. The wireless power receiver 400 may transmit a request associated with setting a transmit power to the wireless power transmitter 200. The wireless power transmitter 200 may set the transmit power, that is, the transmission voltage level to about 10 V as a response to the request.

The wireless power receiver 400 may set each of the amount of transmit power and the receive power state to a default value and may transmit a request for information associated with the amount of transmit power to the wireless power transmitter 200. The wireless power receiver 400 may receive the amount of transmit power as a response to the request from the wireless power transmitter 200.

The wireless power receiver 400 may calculate reception efficiency corresponding to the specified state as a percentage of the set amount of receive power to the received amount of transmit power. The amount of receive power may be an amount of power calculated by the default value in Table 1 above (e.g., a value obtained by multiplying a reception voltage level of the default value by an amount of receive current of the default value). Alternatively, the amount of receive power may be an amount of power detected by the sensing circuitry 480 of FIG. 4 (e.g., a value obtained by multiplying the detected reception voltage level by the amount of receive current).

The wireless power receiver 400 may fix the transmission voltage level and may calculate reception efficiency corresponding to each of the changed receive power states while

TABLE 1

| Receive power of 9 W STEP | RX Setting value of Receiver | | | TX Measurement value of Transmitter | | Amount of transmit power | Reception efficiency (%) | |
|---|---|---|---|---|---|---|---|---|
| | Voltage (V) | Current (A) | Input power (W) | Voltage (V) | Current (A) | Input power (W) | | |
| 1 | 10 | 0.9 | 9 | 9 | 1.35 | 12.15 | 74.07% | Default value |
| 2 | 10.5 | 0.86 | 9 | 9 | 1.3 | 11.7 | 76.92% | |
| 3 | 11 | 0.82 | 9 | 9 | 1.28 | 11.52 | 78.13% | Determination |
| 4 | 11.5 | 0.78 | 9 | 9 | 1.31 | 11.79 | 76.34% | |
| 5 | 9.5 | 0.95 | 9 | 9 | 1.36 | 12.24 | 73.53% | |
| 6 | 9 | 1.00 | 9 | 9 | 1.38 | 12.42 | 72.46% | |
| 7 | 8.5 | 1.06 | 9 | 9 | 1.39 | 12.51 | 71.94% | |
| 8 | 8 | 1.13 | 9 | 9 | 1.4 | 12.6 | 71.43% | |

The wireless power receiver 400 may calculate reception efficiency while adjusting a receive power state while the battery 460 of FIG. 4 is charged and may determine a receive power state with the calculated highest reception efficiency.

For example, referring to step 1 in Table 1 above, when detecting the wireless power transmitter 200, the wireless power receiver 400 may set an amount of transmit power and a receive power state to a specified state (e.g., the default value in Table 1 above). The specified state may be a state changing receive power states in steps 2 to 8. For example, the wireless power receiver 400 may set the reception voltage level and the amount of receive current to about 10 V and about 0.9 A, respectively, in step 2. For example, the wireless power receiver 400 may set the reception voltage level and the amount of receive current to about 10.5 V and about 0.86 A, respectively, in step 3. For example, the wireless power receiver 400 may set the reception voltage level and the amount of receive current to about 11 V and about 0.82 A, respectively, in step 4. For example, the wireless power receiver 400 may set the reception voltage level and the amount of receive current to about 9.5 V and about 0.95 A, respectively, in step 5. For example, the wireless power receiver 400 may set the reception voltage level and the amount of receive current to about 9 V and about 1 A, respectively, in step 6. For example, the wireless power receiver 400 may set the reception voltage level and the amount of receive current to about 8.5 V and about 1.06 A, respectively, in step 7. For example, the wireless power receiver 400 may set the reception voltage level and the amount of receive current to about 8 V and about 1.13 A, respectively, in step 8. The wireless power receiver 400 may calculate reception efficiency corresponding to the receive power state set in each of steps 2 to 8.

After adjusting the receive power states in a total of 8 steps, the wireless power receiver 400 may determine a receive power state in step 3 with the calculated highest reception efficiency (when the reception voltage level equals about 11 V and when the amount of receive current equals about 0.86 A) among receive power states in steps 1 to 8 as a power state associated with charging the battery 460. The wireless power receiver 400 may change and set a receive power state associated with charging the battery 460 depending on the determined state and may charge the battery 460 in the receive power state.

Table 2 below is an example of power control for adjusting an amount of transmit power and a receive power state according to an embodiment.

amount of transmit power and a receive power state, which have the calculated highest reception efficiency. For example, the wireless power receiver 400 may fix the transmission voltage level to about 9V in steps 1 to 6 and may calculate reception efficiency while adjusting the receive power state depending on a specified pattern. The adjusting according to the specified pattern may be to change and set the receive power voltage and the amount of receive current sequentially in an order of (about 10 V, about 0.9 V)→(about 10.5 V, about 0.86 V)→(about 11 V, about 0.82 V)→(about 11.5 V, about 0.78 V)→(about 9.5 V, about 0.95 V)→(about 9 V, about 1.0 V). Furthermore, the wireless power receiver 400 may fix the transmission voltage level at about 8 V in steps 7 to 12 and may calculate reception efficiency while adjusting the receive power state depending on the specified pattern. Moreover, the wireless power receiver 400 may fix the transmission voltage level at about 10 V in steps 13 to 18 and may calculate reception efficiency while adjusting the receive power state depending on the specified pattern. After changing power states in a total of 18 steps, the wireless power receiver 400 may determine the transmit power state and the receive power state in step 15 with the highest reception efficiency as a power state associated with charging the battery 460. The wireless power receiver 400 may change the power state associated with charging the battery 460 to the determined transmit power state and receive power state and may charge the battery 460.

TABLE 2

| | RX | | | TX | | | | |
|---|---|---|---|---|---|---|---|---|
| Receive power | Setting value of Receiver | | | Measurement value of Transmitter | | Amount of transmit power | Reception efficiency | |
| of 9 W STEP | Voltage (V) | Current (A) | Input power (W) | Voltage (V) | Current (A) | Input power (W) | (%) | |
| 1 | 10 | 0.9 | 9 | 9 | 1.35 | 12.15 | 74.07% | Default value |
| 2 | 10.5 | 0.86 | 9 | 9 | 1.3 | 11.7 | 76.92% | |
| 3 | 11 | 0.82 | 9 | 9 | 1.28 | 11.52 | 78.13% | |
| 4 | 11.5 | 0.78 | 9 | 9 | 1.31 | 11.79 | 76.34% | |
| 5 | 9.5 | 0.95 | 9 | 9 | 1.36 | 12.24 | 73.53% | |
| 6 | 9 | 1.00 | 9 | 9 | 1.38 | 12.42 | 72.46% | |
| 7 | 10 | 0.9 | 9 | 9 | 1.48 | 11.84 | 72.46% | |
| 8 | 10.5 | 0.86 | 9 | 9 | 1.5 | 12 | 76.01% | |
| 9 | 11 | 0.82 | 9 | 9 | 1.52 | 12.16 | 75.00% | |
| 10 | 11.5 | 6.78 | 9 | 9 | 1.54 | 12.32 | 74.01% | |
| 11 | 9.5 | 0.95 | 9 | 9 | 1.46 | 11.68 | 73.05% | |
| 12 | 9 | 1.00 | 9 | 9 | 1.44 | 11.52 | 77.05% | |
| 13 | 10 | 0.9 | 9 | 10 | 1.2 | 12 | 78.13% | |
| 14 | 10.5 | 0.86 | 9 | 10 | 1.16 | 11.6 | 75.00% | |
| 15 | 11 | 0.82 | 9 | 10 | 1.12 | 11.2 | 77.59% | |
| 16 | 11.5 | 0.78 | 9 | 10 | 1.16 | 11.6 | 80.36% | Determination |
| 17 | 9.5 | 0.95 | 9 | 10 | 1.22 | 12.2 | 73.77% | |
| 18 | 9 | 1.00 | 9 | 10 | 1.24 | 12.4 | 72.58% | |

Referring to Table 2 above, the wireless power receiver 400 may calculate reception efficiency while adjusting at least one of an amount of transmit power or a receive power state while the battery 460 is charged and may determine an Table 3 below is an example of power control for adjusting a receive power state based on comparison between reception efficiency before a power state is adjusted and reception efficiency after the power state is adjusted.

TABLE 3

| Receive power of 9 W STEP | RX Setting value of Receiver | | | TX Measurement value of Transmitter | | | Reception efficiency (%) | |
|---|---|---|---|---|---|---|---|---|
| | Voltage (V) | Current (A) | Input power (W) | Voltage (V) | Current (A) | Input power (W) | | |
| 1 | 10 | 0.9 | 9 | 9 | 1.35 | 12.15 | 74.07% | Default value |
| 2 | 10.5 | 0.86 | 9 | 9 | 1.3 | 11.7 | 76.92% | |
| 3 | 11 | 0.82 | 9 | 9 | 1.28 | 11.52 | 78.13% | Determination |
| 4 | 11.5 | 0.78 | 9 | 9 | 1.31 | 11.79 | 76.34% | |

Referring to Table 3 above, the wireless power receiver 400 may compare previous reception efficiency with current reception efficiency while adjusting a receive power state (a reception voltage level and an amount of receive current) and may determine a receive power state based on the compared result. When the current reception efficiency is greater than the previous reception efficiency, the wireless power receiver 400 may continue adjusting the receive power state. When the current reception efficiency is less than or equal to the previous reception efficiency, the wireless power receiver 400 may restore a current receive power state to a previous receive power state and may charge the battery 460. For example, the wireless power receiver 400 may set a receive power state to correspond to step 1 to calculate reception efficiency and may change the receive power state to correspond to step 2 to calculate reception efficiency. Because the current reception efficiency (e.g., the reception efficiency in step 2) is greater than the previous reception efficiency (e.g., the reception efficiency in step 1), the wireless power receiver 400 may adjust the receive power state to correspond to step 3 and may calculate reception efficiency. Because the reception efficiency in step 3 is greater than the reception efficiency in step 2, the wireless power receiver 400 may adjust the receive power state to correspond to step 4 and may calculate reception efficiency. The wireless power receiver 400 may identify that the reception efficiency in step 4 is less than or equal to the reception efficiency in step 3 and may restore the power state associated with charging the battery 400 to correspond to step 3, thus charging the battery 460.

Table 4 below is an example of power control for determining a transmit power state subsequent to determining a receive power state according to an embodiment.

Referring to Table 4 above, the wireless power receiver 400 may compare previous reception efficiency with current reception efficiency while adjusting a receive power state and may determine a receive power state based on the compared result. When determining the receive power state, the wireless power receiver 400 may fix a receive power depending on the determined receive power state and may adjust a transmission voltage level. The wireless power receiver 400 may compare the current reception efficiency with the previous reception efficiency while adjusting a transmission voltage level and may determine a transmission voltage level based on the result of the comparison. For example, the wireless power receiver 400 may compare the previous reception efficiency with the current reception efficiency while adjusting a receive power state depending on steps 1 to 4. The wireless power receiver 400 may identify that the reception efficiency in step 4 is less than or equal to the reception efficiency in step 3 and may determine a receive power state associated with charging the battery 460 as a power state in step 3 (where the reception voltage level equals about 11 V and where the amount of receive current equals about 0.82 A). The wireless power receiver 400 may fix the receive power state at the determined power state in step 3 and may compare the current reception efficiency with the previous reception efficiency while adjusting the transmit power state in steps 5 to 8. The wireless power receiver 400 may identify that the reception efficiency in step 8 is less than or equal to the reception efficiency in step 7 and may determine the transmit power state associated with charging the battery 460 as a power state in step 7 (where the transmission voltage equals about 10.5 V). The wireless power receiver 400 may restore the transmit power state to the determined power state and may charge the battery 460.

TABLE 4

| Receive power of 9 W STEP | RX Setting value of Receiver | | | TX Measurement value of Transmitter | | | Reception efficiency (%) | |
|---|---|---|---|---|---|---|---|---|
| | Voltage (V) | Current (A) | Input power (W) | Voltage (V) | Current (A) | Input power (W) | | |
| 1 | 10 | 0.9 | 9 | 9 | 1.35 | 12.15 | 74.07% | Default value |
| 2 | 10.5 | 0.86 | 9 | 9 | 1.3 | 11.7 | 76.92% | |
| 3 | 11 | 0.82 | 9 | 9 | 1.28 | 11.52 | 78.13% | |
| 4 | 11.5 | 0.78 | 9 | 9 | 1.31 | 11.79 | 76.34% | |
| 5 | 11 | 0.82 | 9 | 9.5 | 1.21 | 11.495 | 78.29% | |
| 6 | 11 | 0.82 | 9 | 19 | 1.12 | 11.2 | 80.36% | |
| 7 | 11 | 0.82 | 9 | 10.5 | 1.05 | 11.025 | 81.63% | Determination |
| 8 | 11 | 0.82 | 9 | 11 | 1.03 | 11.33 | 79.44% | |
| 9 | 11 | 0.82 | 9 | 8.5 | 1.38 | 11.73 | 76.73% | |
| 10 | 11 | 0.82 | 9 | 8 | 1.52 | 12.16 | 74.01% | |
| 11 | 11 | 0.82 | 9 | 7.5 | 1.65 | 12.375 | 72.73% | |

Figure 14:
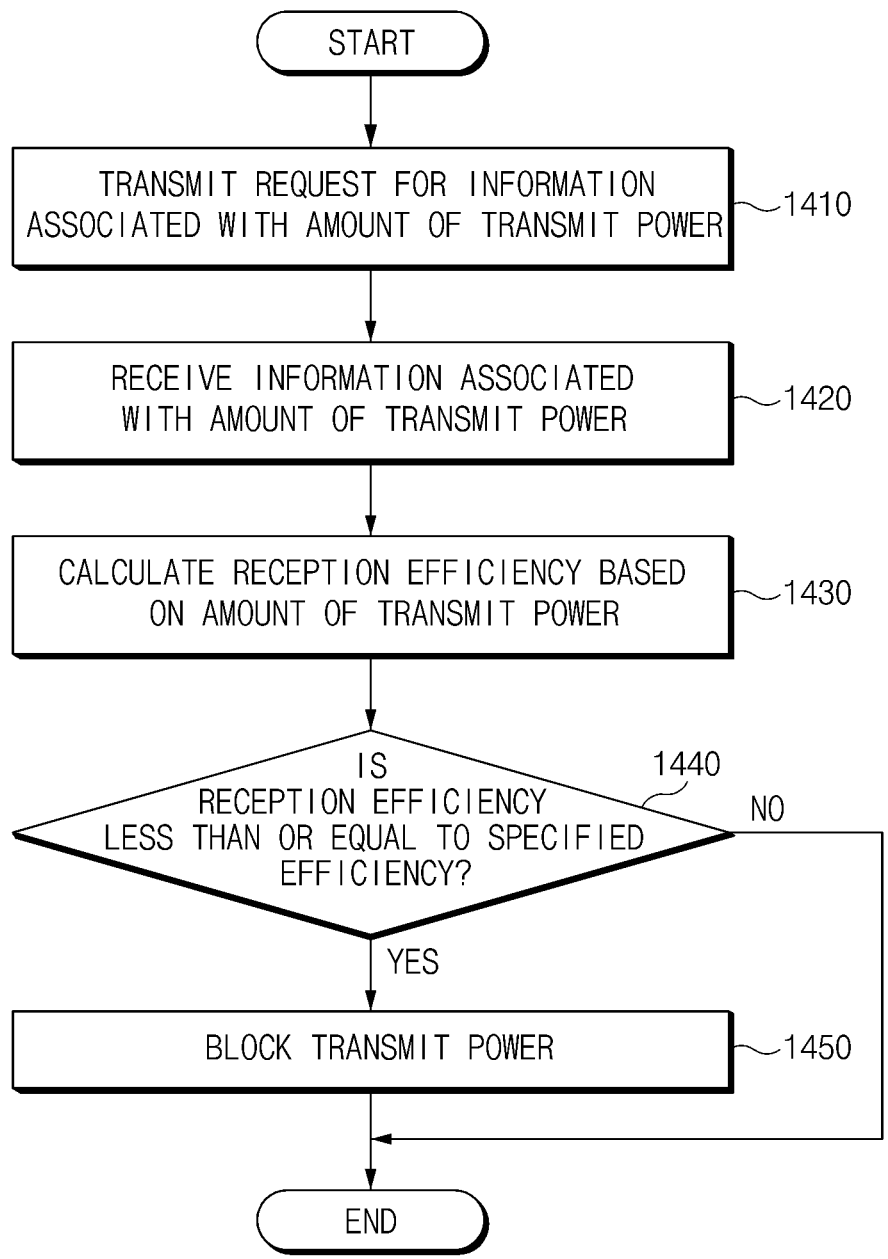
FIG. 14 is a flowchart illustrating a method for detecting foreign substances based on transmission efficiency, according to an embodiment.

FIG. 14 is a flowchart illustrating a method for detecting foreign substances based on transmission efficiency according to an embodiment.

Referring to FIG. 14, in operation 1410, the wireless power receiver 400 of FIG. 4 transmits a request for information associated with an amount of transmit power. For example, while charging the battery 460 of FIG. 4 based on power from the wireless power transmitter 200 of FIG. 2, the wireless power receiver 400 may transmit a request for information associated with an amount of transmit power to the wireless power transmitter 200 on a periodic basis. The request for the information may be transmitted independently of, or together with, for example, a request for information associated with an amount of transmit power for determining the power state associated with charging the battery 460. The request for the information may be performed at, for example, a time when the battery 460 starts to be charged.

In operation 1420, the wireless power receiver 400 receives the information associated with the amount of transmit power as a response to the request from the wireless power transmitter 200.

In operation 1430, the wireless power receiver 400 calculates reception efficiency based on the amount of transmit power, based on the received information associated with the amount of transmit power.

In operation 1440, the wireless power receiver 400 determines whether the reception efficiency is less than or equal to a specified efficiency (corresponding to the above-described second specified efficiency).

When the reception efficiency is less than or equal to the specified efficiency, in operation 1450, the wireless power receiver 400 determines a current situation as an abnormal situation. When determining that the current situation is the abnormal situation, the wireless power receiver 400 may perform processing such that power is not received from the wireless power transmitter 200. For example, the wireless power receiver 400 may deactivate the power regulator 441 and the switch circuitry 443 of FIG. 4. Furthermore, the wireless power receiver 400 may transmit a request associated with stopping transmitting power to the wireless power transmitter 200. When receiving the request associated with stopping transmitting power, the wireless power transmitter 200 may stop transmitting the power to the wireless power receiver 400. The wireless power receiver 400 may detect the abnormal state itself based on the reception efficiency and may block a power transmit path.

When it is identified that the reception efficiency is greater than the specified efficiency in operation 1440, the wireless power receiver 400 continues charging the battery 460.

Figure 15:
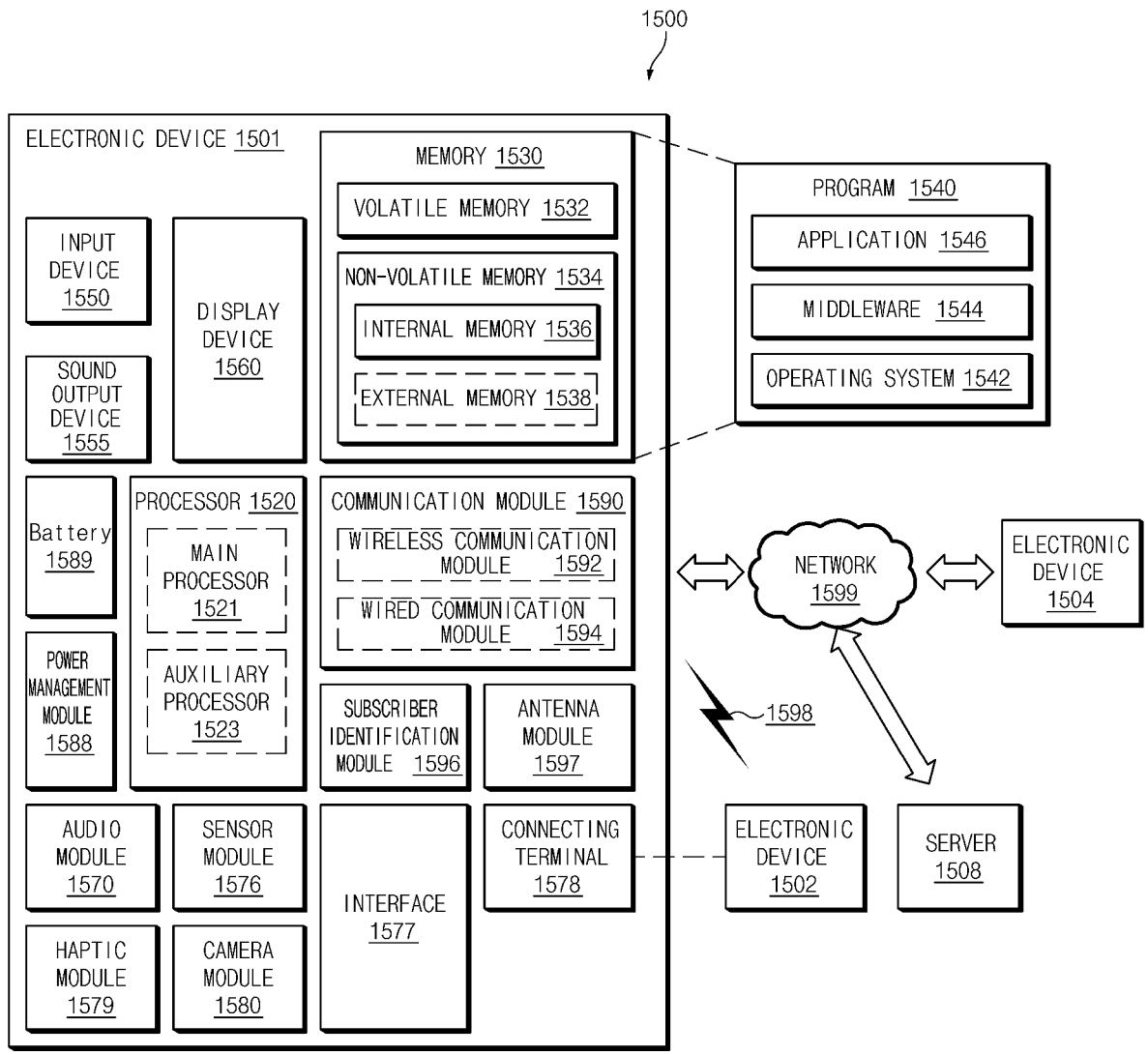
FIG. 15 is a block diagram illustrating an electronic device in a network environment, according to an embodiment.

FIG. 15 is a block diagram illustrating an electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a CPU or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, a keyboard, or a digital pen (e.g., a stylus pen).

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., PCB). According to an embodiment, the antenna module 1597 may include a plurality of antennas. In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

Figure 16:
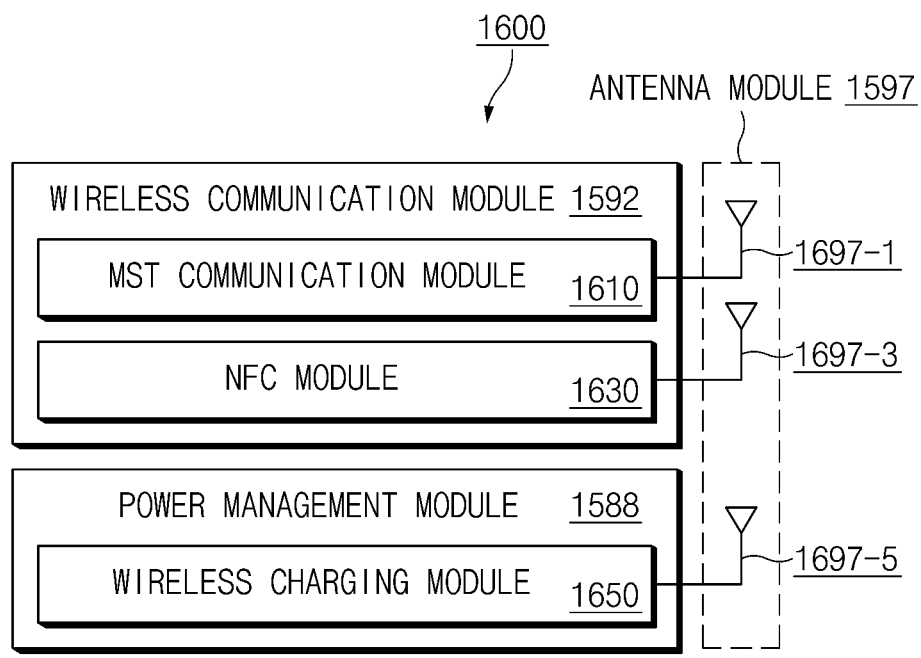
FIG. 16 is a block diagram illustrating a wireless communication module, a power management module, and an antenna module of an electronic device according to an embodiment.

FIG. 16 is a block diagram 1600 illustrating the wireless communication module 1592, the power management module 1588, and the antenna module 1597 of the electronic device 1501 according to various embodiments. Referring to FIG. 16, the wireless communication module 1592 may include a magnetic secure transmission (MST) communication module 1610 or a near-field communication (NFC) module 1630, and the power management module 1588 may include a wireless charging module 1650. In such a case, the antenna module 1597 may include a plurality of antennas that include a MST antenna 1697-1 connected with the MST communication module 1610, a NFC antenna 1697-3 connected with the NFC communication module 1630, and a wireless charging antenna 1697-5 connected with the wireless charging module 1650. For ease of description, the same components as those described in regard to FIG. 15 are briefly described or omitted from the description.

The MST communication module 1610 may receive a signal containing control information or payment information such as card information from the processor 1520, generate a magnetic signal corresponding to the received signal, and then transfer the generated magnetic signal to the external electronic device 1502 (e.g., a point-of-sale (POS) device) via the MST antenna 1697-1. To generate the magnetic signal, according to an embodiment, the MST communication module 1610 may include a switching module (not shown) that includes one or more switches connected with the MST antenna 1697-1, and control the switching module to change the direction of voltage or current supplied to the MST antenna 1697-1 according to the received signal. The change of the direction of the voltage or current allows the direction of the magnetic signal (e.g., a magnetic field) emitted from the MST antenna 1697-1 to change accordingly. If detected at the external electronic device 1502, the magnetic signal with its direction changing may cause an effect (e.g., a waveform) similar to that of a magnetic field that is generated when a magnetic card corresponding to the card information associated with the received signal is swiped through a card reader of the electronic device 1502. According to an embodiment, for example, payment-related information and a control signal that are received by the electronic device 1502 in the form of the magnetic signal may be further transmitted to an external server 1508 (e.g., a payment server) via the network 1599.

The NFC communication module 1630 may obtain a signal containing control information or payment information such as card information from the processor 1520 and transmit the obtained signal to the external electronic device 1502 via the NFC antenna 1697-3. According to an embodiment, the NFC communication module 1630 may receive such a signal transmitted from the external electronic device 1502 via the NFC antenna 1697-3.

The wireless charging module 1650 may wirelessly transmit power to the external electronic device 1502 (e.g., a cellular phone or wearable device) via the wireless charging antenna 1697-5, or wirelessly receive power from the external electronic device 1502 (e.g., a wireless charging device). The wireless charging module 1650 may support one or more of various wireless charging schemes including, for example, a magnetic resonance scheme or a magnetic induction scheme.

According to an embodiment, some of the MST antenna 1697-1, the NFC antenna 1697-3, or the wireless charging antenna 1697-5 may share at least part of their radiators. For example, the radiator of the MST antenna 1697-1 may be used as the radiator of the NFC antenna 1697-3 or the wireless charging antenna 1697-5, or vice versa. In such a case, the antenna module 1597 may include a switching circuit (not shown) adapted to selectively connect (e.g., close) or disconnect (e.g. open) at least part of the antennas 1697-1, 1697-3, or 1697-5, for example, under the control of the wireless communication module 1592 (e.g., the MST communication module 1610 or the NFC communication module 1630) or the power management module (e.g., the wireless charging module 1650). For example, when the electronic device 1501 uses a wireless charging function, the NFC communication module 1630 or the wireless charging module 1650 may control the switching circuit to temporarily disconnect at least one portion of the radiators shared by the NFC antenna 1697-3 and the wireless charging antenna 1697-5 from the NFC antenna 1697-3 and to connect the at least one portion of the radiators with the wireless charging antenna 1697-5.

According to an embodiment, at least one function of the MST communication module 1610, the NFC communication module 1630, or the wireless charging module 1650 may be controlled by an external processor (e.g., the processor 1520). According to an embodiment, at least one specified function (e.g., a payment function) of the MST communication module 1610 or the NFC communication module 1630 may be performed in a trusted execution environment (TEE). According to an embodiment, the TEE may form an execution environment in which, for example, at least some designated area of the memory 1530 is allocated to be used for performing a function (e.g., a financial transaction or personal information-related function) that requires a relatively high level of security. In such a case, access to the at least some designated area of the memory 1530 may be restrictively permitted, for example, according to an entity accessing thereto or an application being executed in the TEE.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the accuracy of power control for charging the battery may be enhanced. In addition, various effects directly or indirectly ascertained through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a battery;
   a coil configured to receive alternating current (AC) power wirelessly transmitted by a wireless charging device;
   a charging circuitry configured to convert the AC power received via the coil into direct current (DC) power and to charge the battery using the DC power; and
   at least one processor configured to:
   set an amount of current and a voltage level associated with charging the battery as a first current value and a first voltage value, respectively;
   receive the AC power from the wireless charging device via the coil;
   convert the AC power into the DC power using the charging circuitry;
   receive information associated with an amount of transmission power transmitted from the wireless charging device while at least partially charging the battery using the DC power by the charging circuitry;
   calculate reception efficiency based on the information associated with the amount of transmission power, an amount of the AC power received from the wireless charging device, and the amount of current and the voltage level associated with charging the battery of the electronic device;
   adjust the amount of current and the voltage level associated with charging the battery to a second current value and a second voltage value, respectively, based at least in part on the calculated reception efficiency; and
   transmit a request associated with changing the amount of transmission power to the wireless charging device based at least in part on the calculated reception efficiency, wherein the information associated with the amount of transmission power corresponds to the DC power before being converted into the AC power by the wireless charging device.

2. The electronic device of claim 1, wherein the at least one processor is further configured to:
   transmit a request for the information associated with the amount of transmission power to the wireless charging device via the coil, and
   receive the information associated with the amount of transmission power as a response to the request from the wireless charging device.

3. The electronic device of claim 1, further comprising a communication circuitry configured to communicate with the wireless charging device,
   wherein the at least one processor is further configured to:
   transmit a request for the information associated with the amount of transmission power to the wireless charging device via the communication circuitry, and
   receive the information associated with the amount of transmission power as a response to the request from the wireless charging device.

4. The electronic device of claim 1, wherein the at least one processor is further configured to adjust at least one of the voltage level or the amount of current, such that the amount of received power is changed within a specified range, as at least a part of adjusting the amount of current and the voltage level associated with charging the battery.

5. The electronic device of claim 1, wherein the at least one processor is further configured to:
   recalculate the reception efficiency after the adjusting of the amount of current and the voltage level associated with charging the battery, and
   adjust the amount of current and the voltage level associated with charging the battery to a current value and a voltage value corresponding to higher reception efficiency.

6. The electronic device of claim 1, wherein the at least one processor is further configured to, when charging the battery with a constant current, calculate the reception efficiency at least once.

7. The electronic device of claim 1, wherein the at least one processor is further configured to, when the reception efficiency is less than or equal to a specified efficiency, block the DC power with which the battery is charged using the charging circuitry.

8. A method of power control by an electronic device, the method comprising:
   setting an amount of current and a voltage level associated with charging a battery of the electronic device as a first current value and a first voltage value, respectively;
   receiving alternating current (AC) power corresponding to a specified state from a wireless charging device via a coil of the electronic device;
   converting the AC power into direct current (DC) power;
   receiving information associated with an amount of transmission power transmitted from the wireless charging device while at least partially charging the battery using the DC power;
   calculating reception efficiency based on the information associated with the amount of transmission power, an amount of the AC power received from the wireless charging device, and the amount of current and the voltage level associated with charging the battery of the electronic device; and
   adjusting the amount of current and the voltage level associated with charging the battery to a second current value and a second voltage value, respectively, based at least in part on the calculated reception efficiency; and
   transmitting a request associated with changing the amount of transmission power to the wireless charging device based at least in part on the calculated reception efficiency,
   wherein the information associated with the amount of transmission power corresponds to the DC power before being converted into the AC power by the wireless charging device.

9. The method of claim 8, wherein receiving information associated with the amount of transmission power transmitted from the wireless charging device to the electronic device includes:
   transmitting a request for the information associated with the amount of transmission power to the wireless charging device via the coil; and
   receiving the information associated with the amount of transmission power as a response to the request from the wireless charging device.

10. The method of claim 8, wherein at least a part of adjusting the amount of current and the voltage level associated with charging the battery includes:
    adjusting at least one of the voltage level or the amount of current, such that the amount of received power is changed within a specified error range.

11. The method of claim 8, further comprising:
    recalculating the reception efficiency after the adjusting of the amount of current and the voltage level associated with charging the battery; and
    adjusting the amount of current and the voltage level associated with charging the battery to a current value and a voltage value corresponding to higher reception efficiency.

12. The method of claim 8, wherein calculating the reception efficiency is performed at least once when the battery is charged with a constant current.

13. The method of claim 8, further comprising:
    when the reception efficiency is less than or equal to a specified efficiency, blocking the DC power with which the battery is charged.

* * * * *